(12) United States Patent
Hinckley

(10) Patent No.: US 6,232,957 B1
(45) Date of Patent: May 15, 2001

(54) TECHNIQUE FOR IMPLEMENTING AN ON-DEMAND TOOL GLASS FOR USE IN A DESKTOP USER INTERFACE

(75) Inventor: Kenneth Paul Hinckley, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/200,321

(22) Filed: Nov. 25, 1998

Related U.S. Application Data

(60) Provisional application No. 60/100,261, filed on Sep. 14, 1998.

(51) Int. Cl.$^7$ ..................................................... G09G 5/00
(52) U.S. Cl. ............................................ 345/156; 345/326
(58) Field of Search ................................... 345/156, 157, 345/163, 326

(56) References Cited

U.S. PATENT DOCUMENTS

| | | | |
|---|---|---|---|
| 4,977,397 | * 12/1990 | Kuo et al. ............................. | 345/163 |
| 5,457,280 | * 10/1995 | White .................................... | 345/163 |
| 5,805,144 | * 9/1998 | Scholder et al. ..................... | 345/163 |
| 5,828,882 | 10/1998 | Hinckley . | |
| 5,977,952 | * 11/1999 | Francis ................................. | 345/156 |

OTHER PUBLICATIONS

B. Buxton, "Integrating the Periphery and Context: A New Taxonomy of Telematics", *Computer Systems Research Institute (CSRI), University of Toronto & Alias Research, Inc.*, pp. 1–10, downloaded on Mar. 23, 1999 from: http://www.dgp.toronto.edu/people/rroom/research/papers/bgfg/bg fg.html.

W. Buxton, "Living in Augmented Reality: Ubiquitous Media and Research Environments", *Computer Systems Research Institute, University of Toronto and Alias/Wavefront Inc.*, pp. 1–17, downloaded on Feb. 1, 1999 from: http://www.dgp.utoronto.ca/OTP/papers/bill.buxton/augmentedReality.html.

(List continued on next page.)

*Primary Examiner*—Richard Hjerpe
*Assistant Examiner*—Ronald Laneau
(74) *Attorney, Agent, or Firm*—Michaelson & Wallace; Peter L. Michaelson

(57) ABSTRACT

A technique, specifically apparatus and accompanying methods, for implementing an on-demand "Tool Glass" based desktop user interface. The interface uses at least one input device capable of detecting touch. A sensed touch transition reflective of a user then making or breaking contact with the device, such by touching the device with a finger of a non-preferred hand or lifting his(her) finger from the device, causes a Tool Glass sheet to be displayed or dismissed. To prevent user distraction, these detected transitions preferably initiate corresponding predefined animation sequences that occur over preset time intervals in which the Tool Glass sheet either begins to fade into view as soon as user contact begins and then begins to fade out from view as soon as user contact ends. Such touch sensing can readily be used to provide "on-demand" display and dismissal of substantially any display widget, e.g., a toolbar, based on sensed contact between each hand of a user and a corresponding input device, such as between a preferred hand and a touch sensitive mouse. Through use of this interface, display clutter can be reduced and displayed application screen area increased at appropriate times during program execution consistent with user action and without imposing any significant cognitive burden on the user to do so; thereby, advantageously improving a "user experience".

83 Claims, 8 Drawing Sheets

OTHER PUBLICATIONS

W. Buxton et al, "A Microcomputer–based Conducting System", *Computer Music Journal*, vol. 4, No. 1, Spring 1980, contents and pp. 8–21.

R. Balakrishnan et al, "The PadMouse: Facilitating Selection and Spatial Positioning for the Non–Dominant Hand", *Proceedings of CHI '98*, Los Angeles, California, Apr. 18–23, 1998, pp. 9–16.

"The Design of a GUI Paradigm based on Tablets, Two–hands and Transparency", *Proceedings of Computer–Human Interaction (CHI) 1997*, Atlanta, Georgia, Mar. 22–27, 1997, pp. 35–42.

K. Fishkin et al, "Enhanced Dynamic Queries via Movable Filters", *Proceedings of CHI 1996 Conference*, pp. 415–420 (as downloaded from http://www.parc.xerox.com/istl/projects/MagicLenses/DynamicQueries.html on Sep. 25, 1998, pp. 1–13).

E. A. Bier et al, "A Taxonomy of See–through Tools", *Proceedings of CHI 1994 Conference*, Apr. 1994, Boston, Massachusetts, pp. 517–523.

M. C. Stone et al, "The Movable Filter as a User Interface Tool" *Proceedings of CHI 1994 Conference*, Apr. 1994, Boston, Massachusetts, pp. 306–312 (as downloaded from http://wwwlparc.xerox.com/istl/projects/MagicLenses/94CHIFilters.html on Sep. 24, 1998, pp. 1–15).

E. A. Bier et al "Toolglass and Magic Lenses: The See–Through Interface", *Proceedings of the Annual Conference on Computer Graphics SIGGRAPH 93*, Anaheim, California, Aug. 1–6, 1993, pp. 73–80.

W. Buxton et al, "A Study in Two–Handed Input", *Proceedings of CHI' 86*, Boston, Massachusetts, Apr. 13–17, 1986, pp. 321–326.

* cited by examiner

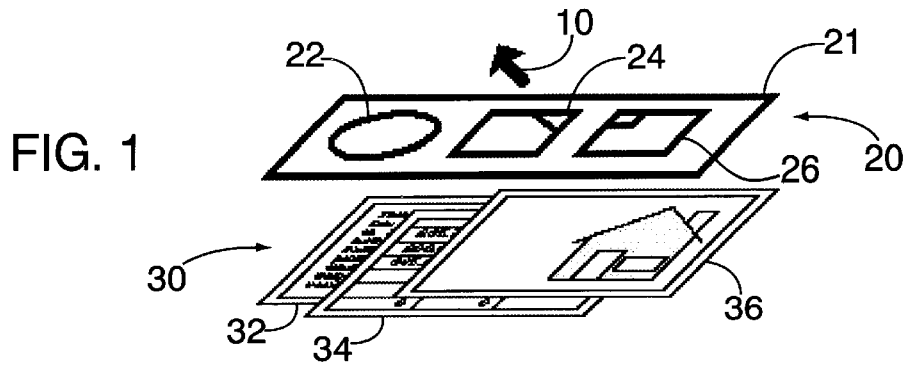
FIG. 1
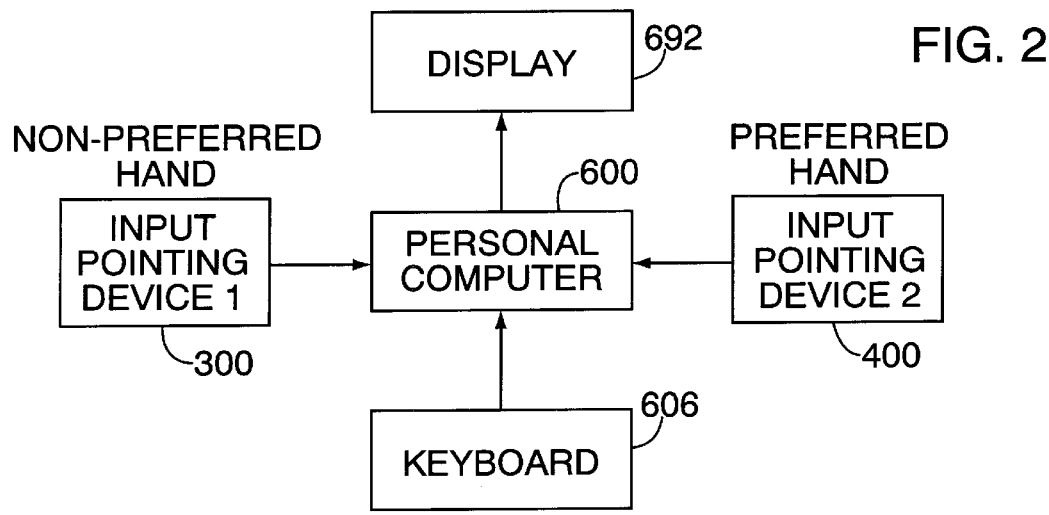
FIG. 2
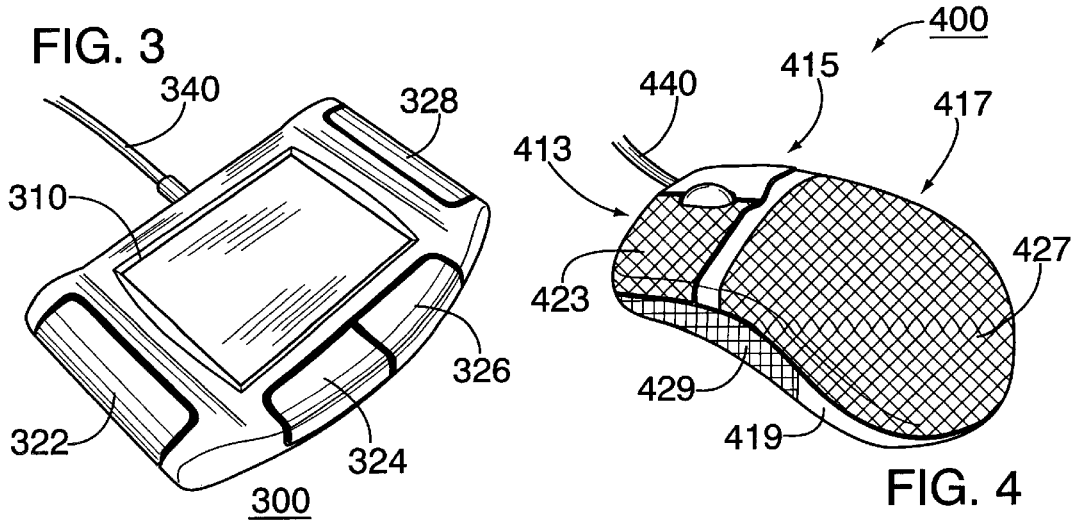
FIG. 3
FIG. 4

TECHNIQUE FOR IMPLEMENTING AN ON-DEMAND TOOL GLASS FOR USE IN A DESKTOP USER INTERFACE

CLAIM TO PRIORITY

This application claims priority of my co-pending U.S. provisional patent application entitled "Toolglass Improvements—On-Demand Tool Sheet; Gesturing Through Tool Sheets", filed Sep. 14, 1998 and assigned Ser. No. 60/100,261.

BACKGROUND OF THE DISCLOSURE

1. Field of the Invention

The invention relates to a technique, specifically apparatus and accompanying methods, for implementing an on-demand "Tool Glass" based desktop user interface. In particular, by sensing whether a user is explicitly touching an input pointing device, a Tool Glass sheet is automatically either displayed or dismissed preferably through a controlled fade in/fade out operation. This technique is particularly, though not exclusively, suited for use in conjunction with such an interface that accepts two-handed user input. Furthermore and advantageously, through the present invention, touch sensing can readily be used to provide "on-demand" display and dismissal, again with preferably controlled fading, of substantially any display widget, e.g., a toolbar, based on sensed contact between a hand of a user and a corresponding touch sensitive input device.

2. Description of the Prior Art

A continuing challenge in the field of computation is to develop an interface that, to the extent possible, facilitates and simplifies interaction between a user and a computer and thus enhances an experience which that user then has with his(her) computer, i.e., a so-called "user experience".

Over the past several years or so, a computer mouse and a keyboard collectively operating with a graphical user interface have become a rather ubiquitous user interface (UI). Through such a UI, a user seeing a graphical display, such as an operating system desktop or a window of an application, positions a cursor on a display screen by directly moving the mouse in two dimensions across a suitable surface. Movement of the cursor simply mimics the movement of the mouse. Various buttons are located on the top of the mouse to enable the user to cause a mouse "click" (button depression) whenever (s)he appropriately positions the cursor at a desired location on the display, such as, e.g.: over a desired icon in a toolbar; over a selection in a pull-down menu; or, within an application window itself, over a selected position in a document. Appropriate software, in, e.g., an application, interprets the "click", in a contextual setting, governed by the cursor location and a then current state of the application, as a particular command and then suitably performs that command.

With this interface, a preferred (dominant) hand of a user, typically a right hand for right-handed individuals, manipulates the mouse, while a non-preferred (non-dominant) hand, a left hand for these individuals, may either manipulate the keyboard or not. Commands can be entered either through the mouse or the keyboard, with the particular use of either device being governed by the current state of, e.g., the application. Through such an interface, the use of the keyboard and mouse are staggered in time. The user manipulates one device, often with one hand, and then manipulates the other, often with the same and/or different hand, but does not manipulate both devices at the same time. Hence, such a conventional interface is commonly referred to as being "one-handed".

Unfortunately, the interaction afforded by a conventional one-handed (keyboard-mouse) UI has simply not kept pace with the tasks which many computer users seek to perform through that interface. In essence, a practical limit has been reached as to the complexity of tasks which a user can readily accomplish through such an interface.

Specifically, as users seek to perform increasingly sophisticated tasks through an application program, they are becoming increasingly frustrated owing to the practical limitations inherent in a conventional one-handed UI. In that regard, a significant number of mouse clicks and/or other mouse and keyboard manipulations is often required to accomplish various tasks through that conventional UI. This, in turn, can impose an cognitive burden on a user, which, for repetitive operations, can be appreciable and rather fatiguing. In particular, conventional graphical user interfaces often position command menus, icons and other user-actuable ("clickable") visual objects along one or more edges on a display screen and peripherally located to a centrally displayed application area. Often, these icons and objects are organized into one or more toolbars and/or other visual groupings (the visual objects, icons, toolbars and other groupings are all commonly referred to as UI "widgets"). Frequently, the program permits the user to appropriately set a software switch(es), through, e.g., a dialog box of "option" settings, that explicitly displays or dismisses any or all of the toolbars and other groupings in an attempt to reduce screen clutter. By dismissing such widgets, added display space can be allocated to displaying application information in lieu of widgets.

However, given the peripheral location of the widgets on the display screen, then, to invoke a desired operation, the user must generally direct his(her) focus of attention back and forth between the application area on the screen and the peripheral "widget" area and correspondingly move the mouse between the two to separately select command(s) and operands. Disadvantageously, this constant shift of attention mentally tires the user as (s)he is forced to repetitively "re-acquire" his(her) current context, and these mouse movements increase user task time; hence collectively depreciating the "user experience". These drawbacks are exacerbated as the display size increases for a constant display resolution.

In an effort to circumvent these drawbacks inherent in a conventional one-handed UI, the art teaches the use of two-handed UI and particularly one that manipulates a so-called "Tool Glass" widget (which, for simplicity, will simply be referred to as a "Tool Glass").

First, human beings cooperatively utilize both of their hands to accomplish a wide variety of manual tasks, often with little or no accompanying cognitive effort. Doing so simply expedites those tasks, such as typing (where fingers of both hands are used in tandem to depress different keys on a keyboard) or manually writing (where one hand positions the paper and the other simultaneously manipulates a pen) or even tapping a nail into a piece of wood (where one hand holds the nail in place while the other lightly swings a hammer to hit a head of the nail), over what would otherwise be required to accomplish those tasks through use of a single hand. Alternatively, other tasks (such as mounting a spare tire on an automobile or handling another bulky object) could not be readily performed at all but for the use of two hands (or at least a suitable physical substitute for one hand).

As early as the mid-1980s, the art of computer interfaces teaches that in accomplishing a compound task, a one-handed computer interface is generally inferior to use of a two-handed interface, and particularly such a two-handed interface which splits the task into sub-tasks that, in turn, could be performed by a user through parallel and coordinated movement of both of his(her) hands. In that regard, see W. Buxton et al, "A Study in Two-Handed Input", *Proceedings of CHI' 86, Boston, Mass., Apr. 13–17, 1986*, pages 321–326 (hereinafter the "Buxton" paper). The Buxton paper teaches the use of an experimental two-handed user interface in which a preferred (dominant) hand (e.g., a right hand for a right-handed person) manipulates, in an absolute positioning mode, one input device, here a moveable digitizer (commonly referred to as a "puck") across a graphics tablet, while a non-preferred (non-dominant) hand (e.g., a left hand for the same person) simultaneously manipulates a second input device, here a so-called "slider". The slider allows one-dimensional input with an input amount being proportional to an amount through which a user moves a track on the slider up or down. Once various test subjects were trained to use these devices, the author of the Buxton paper observed that, through coordinated movement of both devices in parallel, users were able to markedly reduce the time needed to perform various compound user interface tasks, such as a combined selection/positioning task. This, of course, assumes that the two-handed interface is one that requires very little or no cognitive effort on the part of the user to employ. If the cognitive effort to use a given two-handed interface were to appreciably increase, then, of course, the utility of that particular interface, over a conventional one-handed interface, could become rather questionable.

Hence, as the Buxton paper recognizes, an additional degree of freedom afforded by a two-handed interface can potentially simplify a syntax of user input actions needed to accomplish a task, as compared to those needed through a conventional one-handed mouse-keyboard based interface to accomplish that same task, and thus result in an interface that is relatively simple and easy to use.

With this in mind, the art teaches the utility of coupling a Tool Glass to a two-handed UI. See, e.g., G. Kurtenbach et al "The Design of a GUI Paradigm based on Tablets, Two-hands and Transparency", *Proceedings of Computer-Human Interaction (CHI) 1997, Atlanta, Ga., Mar. 22–27, 1997*, pages 35–42; E. A. Bier et al, "A Taxonomy of See-through Tools", *Proceedings of CHI 1994 Conference, April 1994, Boston, Mass., pages 517–523*; and E. A. Bier et al "Toolglass and Magic Lenses: The See-Through Interface", *Proceedings of the Annual Conference on Computer Graphics SIGGRAPH 93, Anaheim, Calif., Aug. 1–6, 1993*, pages 73–80. In essence, a Tool Glass is a mobile semi-transparent sheet that contains a predefined group of semi-transparent icons (or widgets) and is overlaid on an application area of a display between an application display and a traditional cursor. Through a two-handed UI, each hand of a user can simultaneously manipulate a different input pointing device. The Tool Glass itself moves as an entity in concert with movement of the pointing device held by the non-preferred hand (which is a left hand for right-handed individuals). Movement of a cursor tracks movement of the other pointing device then being held by the preferred hand. Through coordinated hand motion, a user can easily position the Tool Glass with his(her) non-preferred hand such that an icon representing a desired operation is positioned over a particular object (being an operand) depicted in the application area and with his(her) preferred hand position the cursor over that icon and then click with (depress a button on) that device to invoke that operation. To facilitate understanding, I will differentiate between a displayed icon representing an operation and such an icon situated on a Tool Glass sheet by referring to the latter as a "tool". By, in effect, "clicking through" the tool, the operation associated with that tool is then executed on the underlying object.

By bringing a Tool Glass to a displayed object, rather than moving a cursor back and forth between the object and a peripheral toolbar, use of a Tool Glass advantageously reduces user distraction and a need for long mouse movements, and reduces the number of clicks required to perform various operations and hence the traditional cognitive effort previously associated with doing so. This, in turn, advantageously decreases user effort and task time, and increases user efficiency. Moreover, use of a Tool Glass advantageously increases available screen area permitted for useful application display by eliminating a need to allocate peripheral screen area for just displaying widgets.

Unfortunately, a Tool Glass, by virtue of its semi-transparent nature, obscures, to a certain degree, its underlying objects and adds clutter to an application area display. The user tolerates the clutter and obscuration as long as (s)he currently intends to use the Tool Glass. Otherwise, these effects are annoying.

Various conventional approaches exist to remedy these drawbacks—though these approaches have all proven inadequate. First, the user could explicitly dismiss a displayed Tool Glass sheet such as by clicking on, e.g., either a "close" button on the Tool Glass itself or a "exit" box in a pull-down menu. A user could also position a Tool Glass, through movement of his(her) non-preferred hand, at an off-screen location whenever it is not in use and then move (e.g., drag) that Tool Glass onto the screen to use it. Unfortunately and in either case, requiring a user to explicitly act in this fashion to either dismiss a Tool Glass and/or display it increases his(her) cognitive burden, and is thus best avoided. Alternatively, a Tool Glass UI could be implemented such that a Tool Glass is automatically dismissed as soon as its corresponding operation is invoked. However, with this approach, a Tool Glass may well be dismissed at an inopportune time, thus potentially frustrating the user.

Given the advantages attainable through use of a Tool Glass particularly when it is employed in conjunction with a two-handed interface, a need exists in the art for such a Tool Glass UI which can display or dismiss a Tool Glass at proper times, based on user activity. Doing so would eliminate unnecessary clutter and obscuration from a displayed application area.

Furthermore, the display and dismissal should occur on an on-demand basis and impose only minimal, if any, cognitive burden on the user. If such an interface could be devised which overcomes the limitations inherent in conventional Tool Glass UIs, I would expect that the ensuing UI, once adopted in desktop user environments, should greatly enhance the "user experience".

SUMMARY OF THE INVENTION

Advantageously, my present inventive "on-demand" interface substantially, if not totally, eliminates these drawbacks in the art.

In accordance with my inventive teachings, a Tool Glass based user interface uses at least one input pointing device, that contains a touch sensor which directly detects when a user touches the device, so as to provide display and dismissal of a Tool Glass sheet on an "on-demand" basis, i.e., whenever the user establishes or breaks physical hand contact with the device.

Specifically, a transition in a touch indication provided by the device reflective of the user then making contact with the device, such by touching the device with a finger of a non-preferred hand, causes the Tool Glass sheet to be displayed. A transition indicative of a user breaking physical contact with the device, such as by lifting his finger off the device, causes the Tool Glass sheet to be dismissed. To prevent user distraction, these detected transitions preferably initiate corresponding predefined animation sequences that occur over preset time intervals in which the Tool Glass sheet either begins to fade into view (typically from an invisible, i.e., totally transparent, state to eventually a pre-defined semi-transparent state) as soon as user contact begins, and then begins to fade out from view (i.e., eventually back to its invisible state) as soon as user contact with the device is broken, i.e., as soon as the user lifts his(her) finger from the device.

Furthermore, such touch sensing can also readily be used to provide "on-demand" display and dismissal of a toolbar (s) (and/or other display widget(s)) by sensing contact between a user's preferred hand and another touch sensitive input device, such as, e.g., a touch sensitive mouse. Here, the depiction of the toolbar in response to detection of touch, specifically when a user grabs the mouse, exploits a user desire, to utilize the toolbar, implicit in the user's action in reaching for and grabbing the mouse. The toolbar would be dismissed when the user releases the mouse, i.e., when touch contact is broken. Displaying and dismissing a toolbar in this fashion advantageously places little, if any, additional cognitive burden on the user. A toolbar can be controllably faded-in and out in the same fashion as a Tool Glass sheet.

Each of the two input devices senses two-dimensional motion and provides one or more outputs indicative of physical user contact with the device. One such device can be a touchpad for non-preferred hand use, the other device, for preferred hand use, can be a so-called "Touch Mouse". The latter device is a touch-sensitive computer mouse that senses two-dimensional motion, in the same manner as does a conventional mouse, and also, through an integrated touch sensor, senses when a palm of a user's hand contacts the device, i.e., when the Touch Mouse is being held.

As a feature of my invention, touch sensing integrated into an input pointing (and/or other user input) device can readily be applied to control the display and dismissal of substantially any display widget, not just a Tool Glass sheet or a toolbar.

Advantageously, through use of my invention, display clutter can be reduced and available application screen area increased at appropriate times during program execution consistent with and governed by user action but without imposing any significant cognitive burden on the user to do so. This, in turn, is likely to significantly improve the "user experience".

BRIEF DESCRIPTION OF THE DRAWINGS

The teachings of the present invention can be readily understood by considering the following detailed description in conjunction with the accompanying drawings, in which:

FIG. 1 depicts a perspective exploded view of a conventional and illustrative Tool Glass as it would appear on a display screen;

FIG. 3 depicts input pointing device 300, e.g., touchpad 300, shown in FIG. 2;

FIG. 4 depicts input pointing device 400, e.g., Touch Mouse 400, shown in FIG. 2;

FIGS. 9A–9C collectively depict a series of screen displays, as would appear on display 692, showing fade-in and fade-out of various toolbars in response to palm contact with input pointing device 400 shown in FIGS. 4 and 6.

To facilitate understanding, identical reference numerals have been used, where possible, to designate identical elements that are common to the figures.

DETAILED DESCRIPTION

Figure 2:
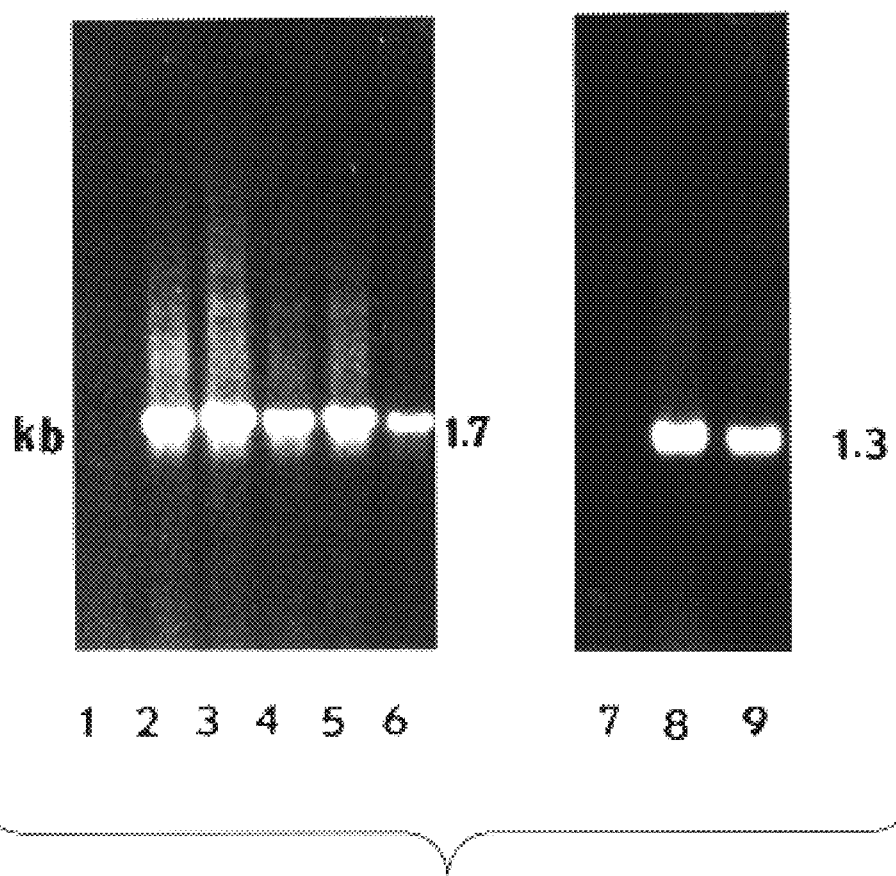
FIG. 2 depicts a highly simplified block diagram of a computer system, illustratively containing a personal computer (PC), that incorporates the teachings of the present invention.

After considering the following description, those skilled in the art will clearly realize that the teachings of my present invention can be advantageously utilized to properly reduce screen clutter in a wide variety of graphic user interfaces used in a multitude of different computer-based processing environments without imposing much, if any, cognitive burden on a user. These environments can illustratively include a stand-alone computer, such as a client personal computer (PC) or workstation; a server; an industrial controller; or any device for which a computer or computer system forms a component, such as a telephone switching system, a measurement system or a control system. In that regard, my invention can be utilized to display on and/or dismiss from a display screen, associated with such a system and on an "on-demand" basis, any of a wide range of different display widgets while imposing only minimal, and in all likelihood no additional, cognitive burden on the user. Nevertheless, since my invention is particularly useful in a PC for displaying and dismissing a Tool Glass sheet, from a display screen, then, to simplify the following discussion and facilitate understanding, I will discuss my invention in this context and with appropriate extensions being noted.

FIG. 1 depicts a perspective exploded view of a conventional and illustrative Tool Glass as it would appear on a display screen.

As shown, Tool Glass 20 is mobile semi-transparent sheet 20 that contains a predefined group of semi-transparent icons (widgets), e.g., icons 22, 24 and 26. This sheet is overlaid onto application area 30, which here contains three illustrative overlapping application windows 32, 34 and 36, but situated below cursor 10, thus forming a three-layer graphical interface. Each icon represents a particular operation. For ease of reference and to differentiate those icons situated on a Tool Glass sheet from any other icon, I will refer to each of the former icons as a "tool". Each such tool is commonly referred to as a "see-through" or "click-through" tool. Tools are grouped into tiles, with a Tool Glass sheet, such as sheet 21, displaying one such tile (here containing tools 22, 24 and 26) at a time. Generally, a Tool Glass interface permits a user to customize a tile to just contain a specific set of desired tools, similar to an effect obtained by a user when customizing a toolbar.

By way of example, tool 22 could represent a magnification tool which, when invoked, increases a displayed size of an object situated under the tool. Tools 24 and 26 could signify a coloring or shading operation, respectively, to change coloration or shading of an underlying object to match a specific color or shading then being shown in a triangular area in the upper-right hand corner or in a square area in an upper left hand corner of the tool.

The Tool Glass itself moves as an entity in concert with movement of an input pointing device. Once the Tool Glass sheet, e.g., sheet 20, is appropriately positioned such that a desired tool on that sheet is located directly over an object situated in an underlying application window, the user can simply position the cursor above this tool and then "click" (depress a button on that device) to invoke the tool, i.e., effectively "clicking through the tool", on the underlying application object. That object becomes an operand of the tool. Though, not relevant here, multiple Tool Glass sheets can be overlaid on each other such that a user can click through multiple tools to cause multiple corresponding operations on a common underlying object.

For further information about Tool Glasses, the reader is referred to, e.g., G. Kurtenbach et al "The Design of a GUI Paradigm based on Tablets, Two-hands and Transparency", *Proceedings of Computer-Human Interaction (CHI)* 1997, *Atlanta, Ga., Mar.* 22–27, 1997, pages 35 42; E. A. Bier et al, "A Taxonomy of See-through Tools", *Proceedings of CHI 1994 Conference, April* 1994, *Boston, Mass.*, pages 517–523; and E. A. Bier et al "Toolglass and Magic Lenses: The See-Through Interface", *Proceedings of the Annual Conference on Computer Graphics SIGGRAPH* 93, *Anaheim, Calif., Aug.* 1–6, 1993, pages 73–80. All these publications are incorporated by reference herein.

For ease of use and user efficiency, Tool Glass sheets are preferably used in conjunction with a two-handed interface. With such an interface, as shown in FIG. 2, a user situated at computer system 600 manipulates two input pointing devices: input pointing device 1 (also denoted as device 300) with (his)her non-preferred hand (which, for right-handed individuals, is a left hand) and input pointing device 2 (also denoted as device 400) with his(her) preferred (dominant) hand (which is a right-hand for these same individuals). The three-layered graphical interface is simultaneously depicted on display 692, which is a typical computer monitor. These two devices are connected to computer system 600, as is display 692 and keyboard 606. The user can also manually enter command and other input into the computer through the keyboard.

The position of the cursor and the Tool Glass sheet track the position of input devices 300 and 400, respectively. Hence, while viewing an application display, the user can move device 300 then being held by, e.g., his(her) left hand to bring Tool Glass sheet 20 into a desired position with a tool overlaying an object in the application display. Once sheet 20 is appropriately positioned, the user can then move device 400 with his(her) right hand to place the cursor over the desired tool. Thereafter, the user can simply click device 400 to invoke that tool. Through coordinated hand motion, these operations can occur essentially simultaneously, thus reducing task time and increasing user efficiency.

Currently, conventional Tool Glass based user interfaces possess various drawbacks. First, continued display of an unwanted Tool Glass sheet can be annoying. By virtue of its semi-transparent nature, a Tool Glass sheet obscures, to a certain degree, its underlying display objects and adds clutter to an application area display. A user tolerates the clutter and obscuration only so long as (s)he currently intends to use the Tool Glass, but not in other instances. Second, by virtue of various conventional attempts to alleviate this clutter, either a cognitive burden is placed on the user to explicitly dismiss or move an unwanted Tool Glass sheet away, or, if the sheet is automatically dismissed, the user can be subjected to further annoyance and frustration. Specifically, one conventional approach requires a user to, e.g., either explicitly click on a "close" button (or the like) to either dismiss a Tool Glass sheet or to explicitly move (drag) the sheet to an off-screen location—either of which impose a cognitive burden on the user. A second conventional approach automatically dismisses the sheet upon execution of an associated operation. However, with this approach, the sheet could be dismissed at improper times, thus leading to further annoyance and user frustration.

Advantageously, the present inventive "on-demand" interface substantially, if not totally, eliminates these drawbacks.

In accordance with my inventive teachings, a Tool Glass based user interface uses at least one input pointing device which is capable of detecting when a user touches the device so as to provide display and dismissal of a Tool Glass sheet on an "on-demand" basis. A transition in a touch indication provided by the device reflective of the user then making physical contact with the device, such by touching the device with a finger of a non-preferred hand, causes the Tool Glass sheet to be displayed. A transition indicative of a user breaking contact with the device, such as by lifting his finger off the device, causes the Tool Glass sheet to be dismissed. To prevent user distraction, these detected transitions preferably initiate corresponding predefined animation sequences that occur over preset time intervals in which the Tool Glass sheet either begins to fade into view (typically from an invisible, i.e., totally transparent, state to eventually a predefined semi-transparent state) as soon as user contact begins, and then begins to fade out from view (i.e., eventually back to its invisible state) as soon as user contact with the device is broken, i.e., as soon as the user lifts his(her) finger from the device. Furthermore, depending on a specific touch-sensitive input device used, it is sometimes preferable to begin the fading after a brief time delay or "cooling period" occurs. For example, the user may reach the edge of the touchpad and "reclutch" his(her) hand (e.g., briefly lift up his(her) finger and then re-center it on the pad) to continue cursor motion. It might be annoying for the Tool Glass sheet or other UI widgets to begin fading immediately when this happens. A brief time delay (e.g., approximately 0.5 to 1.0 seconds), coupled with continued contact sensing of the finger, prior to the start of the fading allows brief reclutchings of this sort without any changes to the screen display. Similarly, if a user has not touched the device for a sufficiently long period of time, a similar time delay, coupled with sensing for a release of user contact, prior to the start of a fade-in might be used to prevent a short inadvertent contact from causing the Tool Glass sheet or other UI widgets from fading in and then out, and otherwise annoying the user.

Furthermore and in accordance with my invention, touch induced display and dismissal can also readily be used to display and dismiss a toolbar(s) (and/or other display widget (s)) on an "on-demand" basis by sensing contact between a user's preferred hand and another touch sensitive input pointing device, such as, e.g., a touch sensitive mouse. Here, the depiction of the toolbar in response to detection of touch, specifically when a user grabs the mouse, exploits a user desire, to utilize the toolbar, implicit in the user's action in reaching for and grabbing the mouse. The toolbar would be dismissed when the user releases the mouse, i.e., when touch contact is broken. Displaying and dismissing a toolbar in this fashion advantageously places little, if any, additional cognitive burden on the user. A toolbar can be controllably faded-in and out in the same fashion as a Tool Glass sheet.

Each of the two input pointing devices used in my inventive on-demand user interface senses two-dimensional motion and provides an output indicative of physical user contact with the device.

Illustratively, device 300 is a touchpad for non-preferred hand use. This device senses touch and movement of a finger of a user's non-preferred hand across the device. Device 400 is a touch-sensitive computer mouse (which, for ease of reference, will be referred to from here on as a "Touch Mouse") for preferred-hand use. Not only does the Touch Mouse sense two-dimensional motion, in the same manner as does a conventional mouse, but also, through an integrated touch sensor, senses when a palm of a user's hand contacts the device, i.e., when the Touch Mouse is being held.

Figure 6:
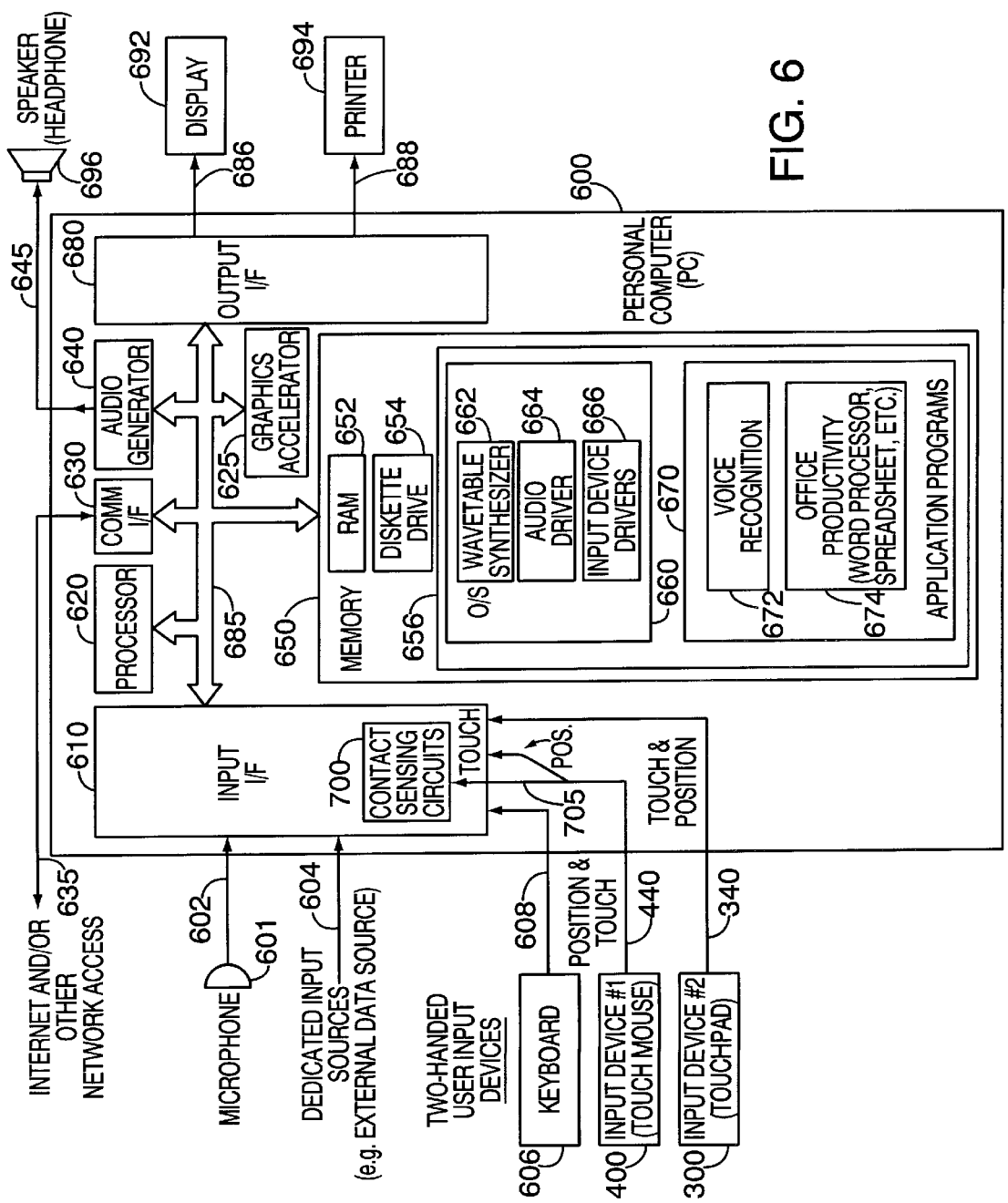
FIG. 6 depicts a block diagram of PC 600 shown in FIG. 2.

FIG. 3 depicts touchpad 300. This touchpad is a conventional touch-sensitive miniature touchpad, without any modifications, currently available from Synaptics Corporation of San Jose, Calif. The advantages of using a touchpad include: its low cost; its small and fixed size footprint; rapid acquisition time and an ability to sense when being touched. Touchpad 300 is formed of touch sensitive surface (tablet) 310 which senses two-dimensional position (surface area) of a finger of a user as that finger contacts and moves across the surface. In addition, the touchpad also contains buttons 322, 324, 326 and 328 peripherally situated to the touch sensitive surface. Though my two-handed interface utilizes sensed positional output and touch outputs from touchpad 300; it does not utilize output from any of the peripheral buttons. The output from the touchpad is routed, via cable 340, to computer system 600, as shown in FIG. 6 (which will be discussed in detail below). For ease of use, the non-preferred hand is not required to click button(s) or control an amount of pressure it exerts on the touchpad. As will be discussed below, the touch output is used to detect, by virtue of finger contact with touch sensitive surface 310, an explicit user request to display a Tool Glass sheet on display 692 (see FIG. 2). The position of the sheet on the display tracks movement of that finger across the touch sensitive surface.

FIG. 4 depicts Touch Mouse 400. Advantageously, computer mice are rather small, quite inexpensive and are intuitive to use for the vast majority of users.

The Touch Mouse is a conventional computer mouse, having left and right mouse buttons 413 and 415, respectively, and palm support 417, that has been augmented by incorporation of one or more touch sensors, each of which senses whether a user is touching an associated area on the mouse. These sensors can illustratively include palm sensor 427 for determining if the user grabs or releases the mouse; contact sensors 423 associated with mouse button 413 to determine when an index (or other) finger of the user contacts that button on not; and/or side contact sensor(s) 429 to determine when a thumb (or other finger) of the user contacts a corresponding area on side 419 of the mouse. The palm sensor provides a signal for effectively sensing gross contact of the hand with the mouse, while each of the button and side contact sensors (collectively "finger" sensors) provides a signal indicative of specific granular and explicit user actions, such as lifting a finger off a particular button or side area on the mouse. Each of the palm and finger sensors produces an independent one-bit signal which, in turn, is sensed and processed by input interfaces (specifically circuits 700 within interfaces 610, both as described below) to provide a corresponding input signal, indicative of user action, to computer system 600 for use by the graphics user interface. Cable 440 which, as shown in FIG. 6, connects both the contact sensors themselves and the standard internal mouse circuitry to computer system 600. Of course, in a wireless embodiment of this input device, the cable might be replaced by a suitable non-tethered connection, such as, e.g., an infrared port connection or radio frequency (RF) transmitter—these details of which are all irrelevant to the present invention and will not be discussed any further.

Though three separate touch sensors are shown in FIG. 4, either fewer or more such sensors than three can be used depending on the number of separate preferred hand-based events that are to be sensed. My present invention only requires palm sensor 427 to sense whether, on a gross basis, the user has grabbed the Touch Mouse or not and thereby implicitly desires to invoke an operation represented by an icon on a toolbar.

Either or both of the other two touch sensors could be used (or even others that can be added to the Touch Mouse) to sense, via contact of a particular finger, other user actions and display or dismiss, on an "on-demand" basis with selective fade-in and fade-out, if desired, of other display widgets, as needed. Inasmuch as a user expends relatively little effort to intentionally lift his(her) finger from button 413 or side region 419, these finger sensors can each detect rather explicit but granular user actions, as differentiated from gross hand contact with the palm support of the mouse. For example, touch sensor 423, depending on whether it is then being contacted or not by a user's finger (such as, for right-handed users, an index finger on the right hand), can instruct computer system 600 to display or dismiss, respectively, a cursor from display 692 (see FIG. 2). Touch sensor 429, shown in FIG. 4, could be used, depending on whether it is then being contacted or not by a user's thumb, could instruct the computer system to either display or dismiss scroll bars from the display. Alternatively, either of the finger sensors can be used as a "touch-to-talk" mechanism that gives the user fine-grain control to gate voice input to a voice recognition application then executing in computer system 600, i.e., to instruct the application to listen for such input or not, and then attempt to recognize it. I believe such a "touch-to-talk" approach is much more effective and ergonomically easier for a user to employ than are common well-known alternatives, such as depressing a particular push-to-talk button on keyboard 606 (see FIG. 2) or using voice commands themselves to gate the voice recognizer. In some other situations, finger sensor 429 (see FIG. 4) can be utilized with (and be viewed as an extension of) palm sensor 427, if desired, inasmuch as some users tend to grip the mouse without actually resting their palm on it. Moreover, as the context of a given application changes during its execution, so too can the particular tools and/or other widgets which are associated with any of touch sensors 423, 427 and 429. Hence, while palm sensor 427 may control the on-demand display and dismissal of a toolbar(s) at some points during execution of an application, at other points, depending upon application context where these toolbars are not appropriate, this sensor might control the on-demand display and dismissal of a cursor or other display widget.

Each touch sensor shown in FIG. 4 is illustratively formed of a conductive paint coating which, to enhance visibility, is indicated by cross-hatching, that has been applied to a corresponding surface of the mouse and senses parasitic capacitance of a hand. Specifically, the finger and palm sensors are formed by corresponding paint coatings applied to left mouse button 413, palm support 417 and a region of side 419 of the mouse, respectively. These sensors generate on/off events when the finger or palm of a hand of the user actually makes contact with a corresponding area on a surface of the mouse. This provides a tight coupling of these events and passive haptic feedback felt as the hand makes (or breaks) contact with that particular area. Each of these three sensors provides a single-bit output and operates independently of the other two.

For further details on the Touch Mouse and a two-handed interface which employs touch sensing, the reader is referred to my three co-pending United States patent applications entitled: "A Technique for Implementing a Two-Handed Desktop User Interface for a Computer", filed Sep. 14, 1998, Ser. No. 09/152,432; "Method of Interacting with a Computer Using a Proximity Sensor in a Computer Input Device", filed Sep. 14, 1998, Ser. No. 09/152,443; and "Proximity Sensor in a Computer Input Device", filed Sep. 14, 1998, Ser. No. 09/152,434; and my co-pending U.S. provisional patent application entitled "Toolglass Improvements—On-Demand Tool Sheet; Gesturing Through Tool Sheets", filed Sep. 14, 1998 and assigned Ser. No. 60/100,261—all four of which are incorporated by reference herein.

Figure 5:
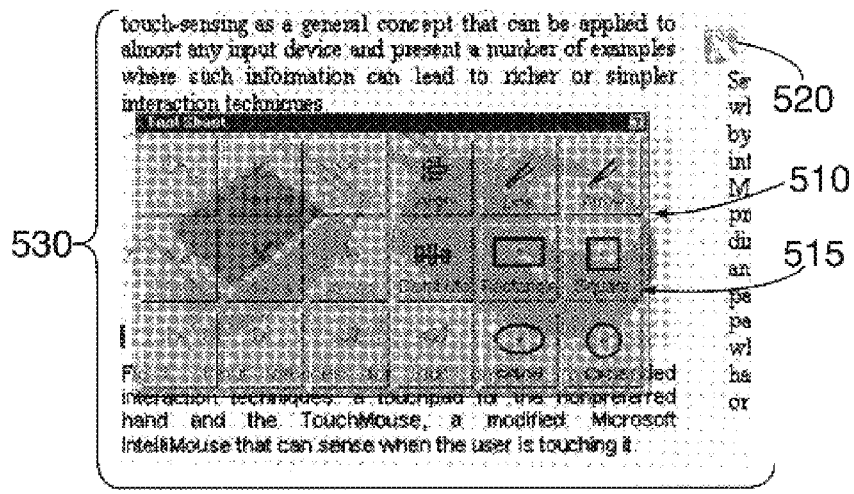
FIG. 5 depicts illustrative Tool Glass 510 as it would appear on a display screen overlaid onto a portion of a document page appearing in an application window.

FIG. 5 depicts illustrative and actual Tool Glass sheet 510 which I developed for use in conjunction with a two-handed UI. This Tool Glass sheet is shown overlaid onto a portion of a document page appearing in an application window. Here, Tool Glass sheet 510 contains eighteen separate tools, of which tool 515 is illustrative, positioned over document portion 530. Those tools that, based on the present context of the application, are active and hence can then be invoked are shown in a bolded format; while those that are then inactive and hence incapable of selection are shown in a grayed format. Hand cursor 520 can be positioned by the user by moving his(her) finger of a non-preferred hand across the touch sensitive surface of touchpad 300 (see FIGS. 2 and 3) and is used to drag the Tool Glass sheet into a desired position.

FIG. 6 depicts a block diagram of computer system (PC) 600.

As shown, PC 600 comprises input interfaces (I/F) 610, processor 620, graphics accelerator 625, communications interface 630, audio generator (sound board) 640, output interfaces 680, and memory 650, all conventionally interconnected by bus 685. Memory 650 generally includes different modalities, including illustratively: random access memory (RAM) 652 for temporary data and instruction store; diskette drive(s) 654 for exchanging information, as per user command, with floppy diskettes; and non-volatile mass store 656 that is usually implemented through a hard disk, typically magnetic in nature. Mass store 656 may also contain a CD-ROM or other optical media reader (not specifically shown) (or writer) to read information from (and write information onto) suitable optical storage media. Mass store 656 stores operating system (O/S) 660 and application programs 670. These application programs illustratively contain voice recognition program 672 for which my inventive Touch Mouse, as noted above, can provide a "touch-to-talk" user control, and office productivity programs 674 such as a word processor, spreadsheet and/or database program. O/S 660 may be implemented by any conventional operating system, such as MICROSOFT WINDOWS NT operating system which is currently available from Microsoft Corporation of Redmond, Wash. (WINDOWS NT is also a registered trademark of Microsoft Corporation). Application programs 670 execute under control of the O/S. The operating system includes suitable input device drivers 666 which support, e.g., the Touch Mouse and the touchpad. In addition, the O/S also includes an audio synthesizer, e.g., MIDI (musical instrument digital interface) wavetable synthesizer 662, to generate appropriate audio cues to indicate, if desired, e.g., cursor movement across and/or icon selection on a toolbar, or cursor movement across and/or tool selection on a Tool Glass sheet. The O/S also includes audio driver 664 appropriate to audio generator 640. The audio generator can be a conventional audio board (such as a model AWE64 Gold Card sound board currently available from Creative Labs, Inc. of Milpitas, Calif.) with its output connected, via lead 645, to speaker (or headphone) 696. Since all other aspects of the O/S are well known, or, in the case of input device drivers 666 readily apparent, to those skilled in the art, I will only address those general sections of the O/S that directly impinge on the present invention.

Graphics accelerator 625 can be any one of a wide multitude of conventional graphics processing circuits (PC cards) which preferably provides well-known alpha-transparency capabilities. These capabilities, can be used, in conjunction with conventional programming, to render a Tool Glass sheet, on a semi-transparent basis, on display 692—as illustrated in, e.g., FIGS. 5, 9C, 9D and 9E (the latter three being discussed in detail below), with controlled fading.

Input interfaces 610 electrically connect, via lines 608, 440 and 340, keyboard 606, Touch Mouse 400 and touchpad 300, respectively, and interface these devices to the PC. With respect to the Touch Mouse, interfaces 610 contain contact sensing circuits 700 which independently interface each touch sensor on the Touch Mouse to a respective input bit, illustratively a bit on an input port (not shown) to the PC. As will be discussed in detail below in conjunction with FIG. 7, each different touch sensor in the Touch Mouse is connected, via leads 705, to a separate contact sensing circuit within circuits 700. Though, for simplicity, circuits 700 are shown within computer system 600, in actuality, these circuits, and more specifically individual ones of sensor circuits 710 (see FIG. 7), are more likely to be incorporated within their associated input devices, here input devices 1 and 2 (400 and 300, respectively). The position (POS) sensor outputs from the Touch Mouse are routed to conventional mouse inputs of input interfaces 610. Both the touch and position outputs from touchpad 300 are routed, via leads 340, to respective inputs of interfaces 610. In addition, for use with voice recognition program 672, spoken input is sensed by microphone 601 and routed, via leads 602, to an appropriate input of input interfaces 610. In actuality, the microphone would be connected to appropriate audio input circuitry located on the audio board; however, to simplify reader understanding, I have shown the microphone being connected to a separate input to input interfaces 610. Other inputs, not relevant here, can arise from illustrative external sources: network supplied information, e.g., from the Internet and/or other networked facility, through network connection 635 to communications interface 630, or from a dedicated input source, via path(es) 604, to input interfaces 610. Dedicated input can originate from a wide variety of sources, e.g., an external data source. In addition, input information, in the form of files or specific content therein, can also be provided by inserting a diskette containing the information into diskette drive 654 from which PC 600, under appropriate instruction, will access and read that information from the diskette. Input interfaces 610 contain appropriate circuitry to provide necessary and corresponding electrical connections required to physically connect and interface each differing dedicated source of input information to PC 600. Under control of the operating system, application programs 670 exchange commands and data with the external sources, via network connection 635 or path(es) 604, to transmit and receive information typically requested by a user during program execution.

Display 692, such as a conventional color monitor, and printer 694, such as a conventional laser printer, are connected, via leads 686 and 688, respectively, to output interfaces 680. The output interfaces provide requisite circuitry to electrically connect and interface the display and printer to the PC.

Since all other hardware components of PC 600 are conventional and well-known, I have intentionally omitted any details of these components from the remaining discussion.

Though I have specifically referenced word processing as being an application that can advantageously utilize my two-handed interface with an on-demand Tool Sheet and/or on-demand toolbars, my interface is certainly not so limited in its usage. In that regard, this interface will properly function with any application program, O/S or software module that interacts with a user through a graphical user interface appearing on display 692. Moreover, my invention can be used with any such interface to properly automate display and dismissal of any display widget. Hence, by doing so, my invention should expedite, simplify and enhance user interaction and thus heighten "user experience". Though my invention is particularly suited for use with toolbars and a Tool Glass sheet, it is applicable to other display widgets including, e.g.: hover text, scroll bars, window frame and window decorations, title bars, floating tool palettes, modal and non-modal dialog boxes, list or combo boxes, buttons, text entry areas and so forth.

Figure 7:
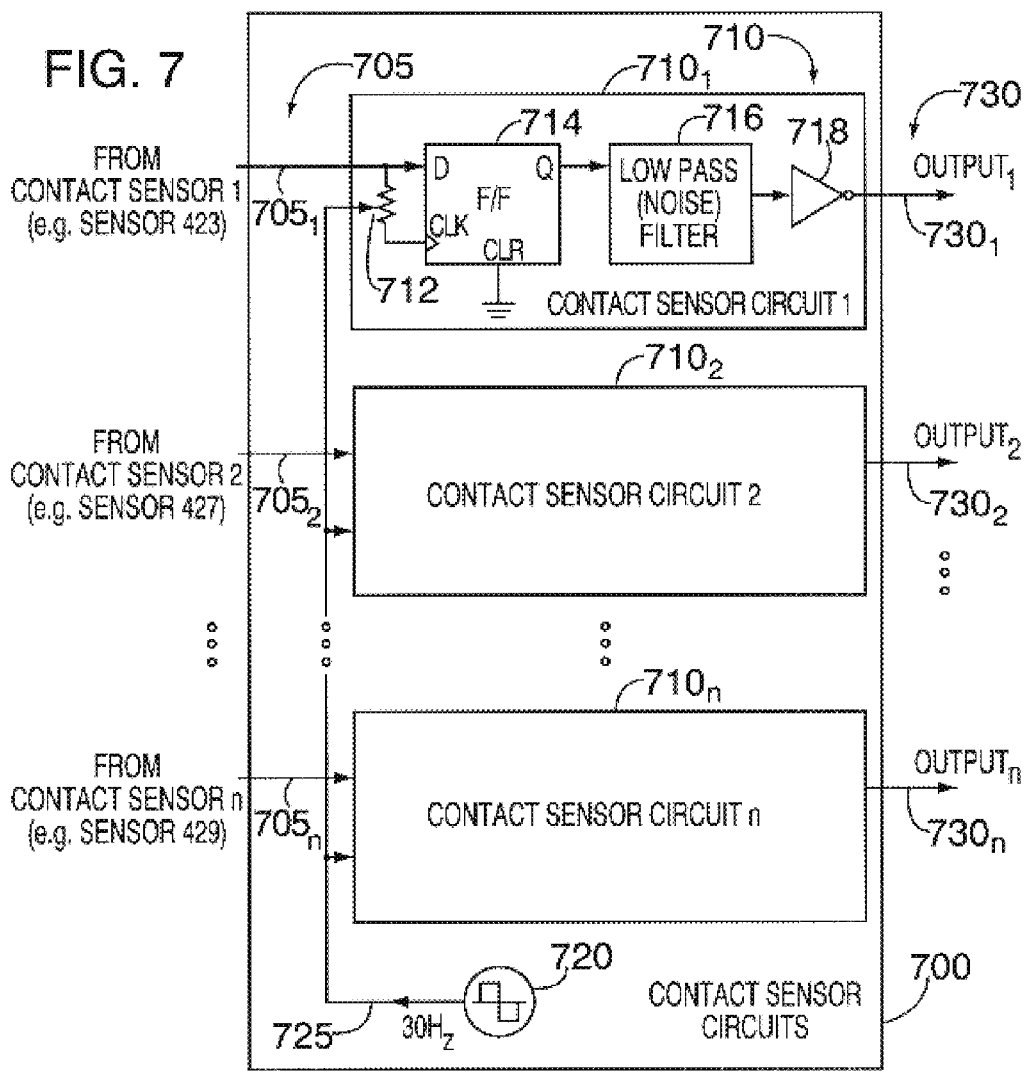
FIG. 7 depicts a block diagram of contact sensing circuit 700 shown in FIG. 6.

FIG. 7 depicts a block diagram of contact sensor circuits 700 that are incorporated within input interface 610 in PC 600 shown in FIG. 6. As noted, circuits 700 connect to the touch sensors on the Touch Mouse and provide a corresponding one-bit input signal to the PC for each such sensor.

In particular and as shown in FIG. 7, circuit 700 contains identical contact sensor circuits 710, having sensor circuits 710$_1$, 710$_2$, . . . , 710$_n$, connected through leads 705, specifically leads 705$_1$, 705$_2$, . . . , 705$_n$, respectively, that connect to corresponding touch sensors on the Touch Mouse. These circuits are all connected, via lead 725, to clock circuit 720 which illustratively produces a 30 Hz output. All the output signals generated by circuits 710 are routed, via leads 730, specifically 730$_1$, 730$_2$, . . . , 730$_n$ for circuits 710$_1$, 710$_2$, . . . , 710$_n$, to an internal parallel port (or other suitable input data connection) associated with input interfaces 610 (see FIG. 6). Though for generality, circuits 700 shown in FIG. 7 include n identical sensor circuits 710, only three of these circuits are used to connect to sensors 423, 427 and 429 (see FIG. 4) on the left finger, palm and side area of the Touch Mouse. If only palm sensing is required, then only one such contact sensor circuit, connected to sensor 427, would be used.

Inasmuch as all the sensor circuits are identical, I will focus only on circuit 710$_1$. The particular circuitry used to implement circuit 710, is illustrative. Clearly, other types of sensor circuitry, including those used for interfacing touch screens as well as those which utilize other forms of converting an analog touch signal into a discrete digital event, could be used instead of that shown.

Illustrative circuit 710$_1$, as shown in FIG. 7, contains clocked D flip/flop 714, low pass filter 716 and inverter 718. The output of clock circuit 720 is applied to an armature of potentiometer 712 which itself is connected across D and clock (CLK) inputs of the flip/flop. A clear (CLR) input to flip/flop 714 is grounded. The sensed output from contact sensor 1, here left finger sensor 423, is routed, via lead 705$_1$, directly to the D-input of the flip/flop. In the absence of any physical contact between a finger of the user and sensor 423, 30 Hz clock pulses appearing on line 725 and across potentiometer 712 to both the D and clock inputs will clock a stream of ones into the flip/flop causing its Q output to remain at a high level. The choice of 30 Hz clock pulses is clearly not critical; other frequencies could be used instead. Once a user touches sensor 723, the parasitic capacitance associated with a finger of the user will effectively ground the D-input. This, in turn, causes the Q output to transition to a low level on the next successive clock cycle and remain at this level as long as this contact continues unabated. Filter 716, which is a low pass noise filter, removes high-frequency (burst and other such short duration) noise from the signal produced at the Q output. A resulting filtered signal is then passed through inverter 718 to provide an active low one-bit output signal on output lead 730, (for left finger sensor 423).

With the above in mind, I will focus on those software and hardware components of computer system 600 that collectively implement my inventive on-demand feature for Tool Glass (and/or other widget) display and dismissal. Inasmuch as all the other hardware and software components of system 600 are irrelevant to the present invention, I will not address any of these components in any further detail.

Figure 8:
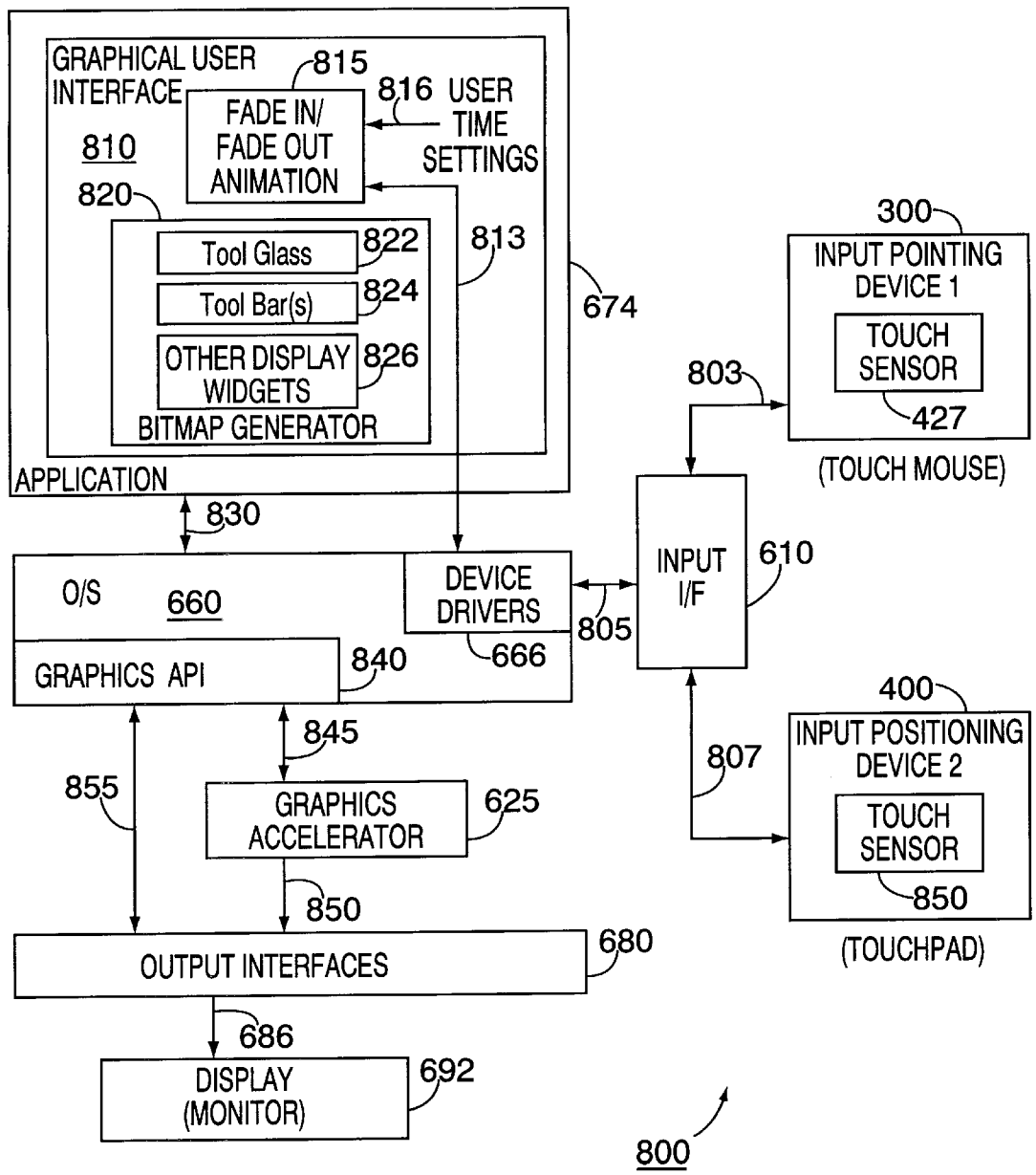
FIG. 8 depicts simplified high-level block diagram 800 of software and hardware components, situated within PC 600, that collectively form an implementation of the present invention.

FIG. 8 depicts simplified block diagram 800 of high-level software and hardware components, situated within PC 600, for displaying and dismissing, on an on-demand basis, a Tool Glass sheet and a toolbar(s). Two illustrative sequences of displays that can be produced by these components are collectively shown in FIGS. 9A–9C and 10A–10E—all of which will be discussed below.

As shown in FIG. 8, these components include application 674 and O/S 660; graphics accelerator 625, output interfaces 680, display 692, input interface 610, and input pointing devices 300 and 400; application program 674 (which, in this instance, can be, e.g., a word processor), specifically GUI 810 therein and within the GUI, fade-in/fade-out animation process 815 and bitmap generator 820, the latter including Tool Glass pattern 822, toolbar pattern(s) 824 and other display widget pattern(s) 826. Other components include, within O/S 660, input device drivers 666 and Graphics API (application programming interface) 840.

Specifically, the touch outputs provided by input pointing devices 300 and 400 are applied, as represented by leads 803 and 807, respectively, to input interfaces 610. These interfaces produce separate signals reflective of whether contact is then being sensed or not by the contact sensor in each pointing device. These signals are routed, as represented by lead 805, to input device drivers 666 that form a component within O/S 660. The device drivers interpret the signals produced by the pointing devices and, in response, generate appropriate events. With respect to touch, these events specify the particular input pointing device and the state of the corresponding touch sensor, i.e., whether hand contact is then detected or not. These events are passed by O/S 660 to application 674 and, ultimately within the application, to GUI process 810. Within this process, the events are processed by fade-in/fade-out animation process 815. The animation process, in response to the occurrence of a state transition of each input pointing device, i.e., whether that device has just started sensing hand contact or has just ceased sensing such contact, and whether a Tool Glass or various toolbar(s) is then being displayed or not, will generate a predefined animation sequence to either controllably fade-in or fade-out either a Tool Glass sheet or predefined toolbar(s).

Bitmap generator 820 stores predefined patterns 822, 824 and 826, typically texture maps, for the Tool Glass sheet, predefined toolbar(s) and/or other display widgets, respectively. These patterns are typically stored as separate files within the application. As application program 674 is invoked, the application, during initialization or after any change to the widget, downloads, as represented by line 830, these patterns to Graphics API 680 which, in turn, routes these patterns to graphics accelerator 680 for local storage therein as texture maps. Alternatively, this downloading may be managed by a service provided by O/S 660.

During subsequent display, the accelerator will read these maps from its local store, polygonally fill these maps as appropriate, and render resulting filled patterns on display 692. Once these maps have been downloaded, then, for either a controlled fade-in/fade-out operation, animation process 815 changes an alpha-transparency value at which the graphics accelerator will render a corresponding filled pattern for a display widget. For a toolbar, the alpha-transparency value is varied across a full range of transparency values (i.e., between approximately $0\alpha$ and $1.0\alpha$, on a linear scale of $0-1\alpha$ where $0\alpha$ is fully transparent and $1.0\alpha$ is fully opaque). For a Tool Glass sheet, the alpha-transparency value is varied across a range of typically $0\alpha$ to approximately $0.7\alpha$, such that, even with the Tool Glass sheet rendered at its maximum opacity, underlying document objects are still visible (which some obscuration) through the sheet.

In essence, for a fade-in or fade-out operation, animation process 815 will issue a series of instructions over a predefined interval of time, specifically one such instruction for each different display frame, to successively change the alpha-transparency value with which a particular display widget is to then be displayed. These instructions will be issued, as also represented by line 830, to O/S 660, which, in turn, will pass these instructions to Graphics API 840 and ultimately to graphics accelerator 625. Fade-in should occur over a relatively short interval of time, such as on the order of approximately 0.5 second. However, so as not to distract a user, fade-out should occur over a relatively long interval, such as on the order of approximately 1–2 seconds. During these intervals, particularly on fade-in, the alpha-transparency values are generally varied in a non-linear fashion. Empirically, I have chosen to utilize a conventional slow-in/slow-out technique commonly used in screen animation. With this technique, the opacity initially changes rather slowly from being substantially, if not, totally transparent (i.e., essentially invisible) to an intermediate value, then increases rather quickly to another intermediate value with further increases then slowing once again until a maximum opacity (either, e.g., $1\alpha$ or $0.7\alpha$ for a toolbar or Tool Glass sheet, respectively) is eventually reached. This results in an approximately "S" shaped curve for opacity as a function of time. The same transparency variations are used for fading-out a display widget (though in a reverse direction). Clearly, other time-based opacity functions, such as linear, can be used to vary the opacity during the fade-in and fade-out intervals. Ultimately, the particular function(s) chosen (with possibly a different function being used for fade-in versus fade-out and, in fact, different such functions can be used for different display widgets, if desired) will likely be empirically determined through appropriate user testing.

Furthermore, a human eye exhibits increased sensitivity to certain colors, such as, e.g., red tones, over others, such as blue tones, for a common luminance. Hence, fading-in a display widget that contains any of the former colors, even at relatively low luminance, could be potentially distracting and more so particularly as these colors become brighter. To avoid such distraction, this display widget could be represented by several different texture maps of different or varying coloration and luminance—particularly for color(s) to which the human eye is most sensitive—until a final map with desired coloration and luminance is displayed. In that regard, a monochrome texture map for this widget could be initially displayed, with texture maps for the same widget but having desired coloration with increasing luminance (or even different coloration for that matter) then being rendered at appropriate times during fade-in, until at the end of the fade-in period, a texture map having a final coloration and luminance is rendered. Fade-out could be accomplished in a similar, though reverse fashion. For example, a display widget could fade-out using a succession of colored texture maps, of decreasing luminance, to a monochrome map which itself then fades out to total transparency, or, at the inception of fade-out, change to a monochrome map of the widget and from there fade-out to total transparency.

If a graphics accelerator is not used, then, as symbolized by line 855, Graphics API 840 can provide graphics output directly to output interfaces 680 (specifically a standard video card, not shown, therein) which, in turn, will generate appropriate video signals and apply those signals, via leads 686, to display 692. In this instance, computer system 600 would need to be sufficiently fast to implement the appropriate graphics capabilities, that would have been provided by accelerator 625, in software. Furthermore, where fade-in and fade-out graphics capabilities are not supported, the display and dismissal of display widgets could occur through other visual techniques. These techniques include, e.g., simply translating the widget by sliding or shuffling it onto the screen from an off-screen position; instantly and completely displaying or dismissing the widget; rotating the widget (if, e.g., a toolbar is on a 3-D surface that rotates into place) and/or zooming in or out interface widgets or portions of a document. However, with these techniques, both the toolbars and the Tool Glass sheet are constrained to being displayed fully opaque. Any of these techniques could also be used along with fading with a graphics accelerator that supports alpha-transparency.

Although alpha-transparency capability is supported by a wide variety of currently existing graphics accelerators, this capability can be readily simulated in software, in a well-known manner, by conventional 2-D (two-dimensional) or 3-D (three-dimensional) graphics APIs, such as D3D (which is a 3-D graphics API currently produced by Microsoft Corporation as a standard component of a WINDOWS operating system—WINDOWS being a registered trademark of Microsoft Corporation), OpenGL (which is currently available in the art) or GDI (which historically is only a 2-D low-level graphics processing layer currently produced by Microsoft Corporation and also incorporated as a standard component of a WINDOWS operating system).

Instances can arise where a display screen is to simultaneously show both a toolbar(s) and a Tool Glass sheet (or other combination of display widgets). In these instances, unwanted interactions can arise that would cause both widgets to fade-in or -out. To prevent these interactions and attendant user frustration, an appropriate decision process, well within the skill in the art, would be incorporated into animation process 815 to then permit only one, rather than both, of these display widgets to fade-in or -out. For example, if both widgets were being displayed but a user is then manipulating the Touch Mouse, then only the Tool Glass would be permitted to fade-out while the toolbars remained fully displayed. The specific decision process would be governed by the particular widgets that could be simultaneously displayed, a need to continue displaying one or more these widgets based on a current contextual setting of the application including an operation then being performed, and relative display prioritization among these widgets.

Figure 9C:
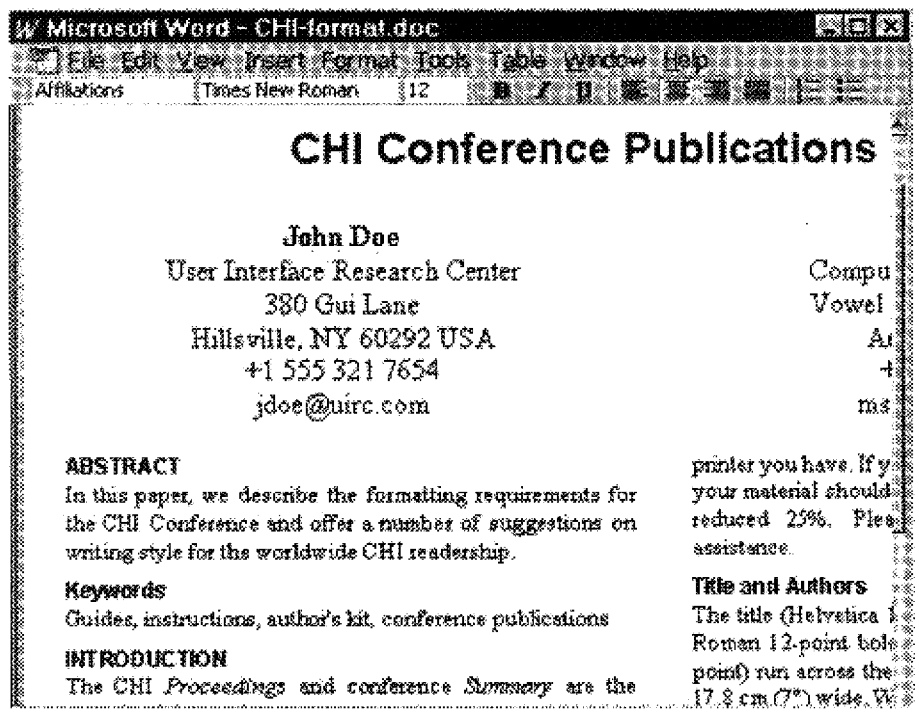

With respect to depicting "on demand" toolbars, FIG. 9A shows illustrative display 900 as it would appear on display 692 (see FIGS. 2 and 6) immediately prior to a user releasing the Touch Mouse. Here, as shown in FIG. 9A, toolbars 910 are totally opaque and completely visible. When the user breaks hand contact with the Touch Mouse, by, e.g., releasing the Touch Mouse from his(her) preferred hand, toolbars 910 will start fading-out, as shown in FIG. 9B. Fading will end approximately 0.5 seconds later with display 900, as shown in FIG. 9C, resulting. Here, the toolbars are no longer visible.

Figure 10A:
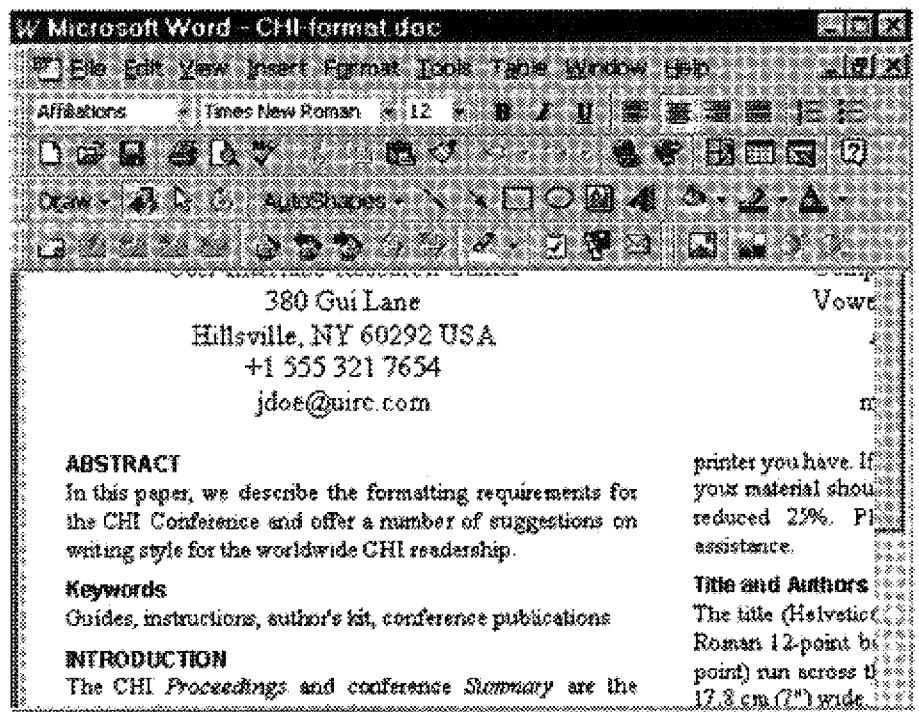
FIGS. 10A–10E collectively depict a series of screen displays, as would appear on display 692, showing fade-in and fade-out of a Tool Glass sheet and various toolbars in response to finger contact with input pointing device 300, shown in FIGS. 3 and 6, and palm contact with input pointing device 400, respectively.
Figure 10B:
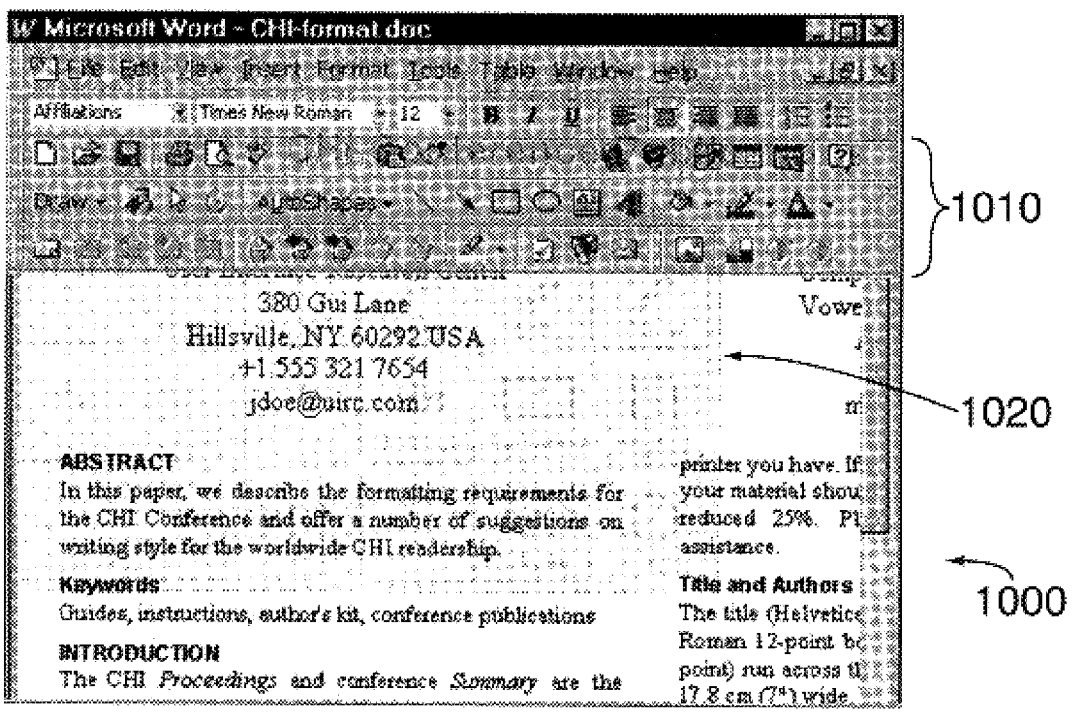
Figure 10C:
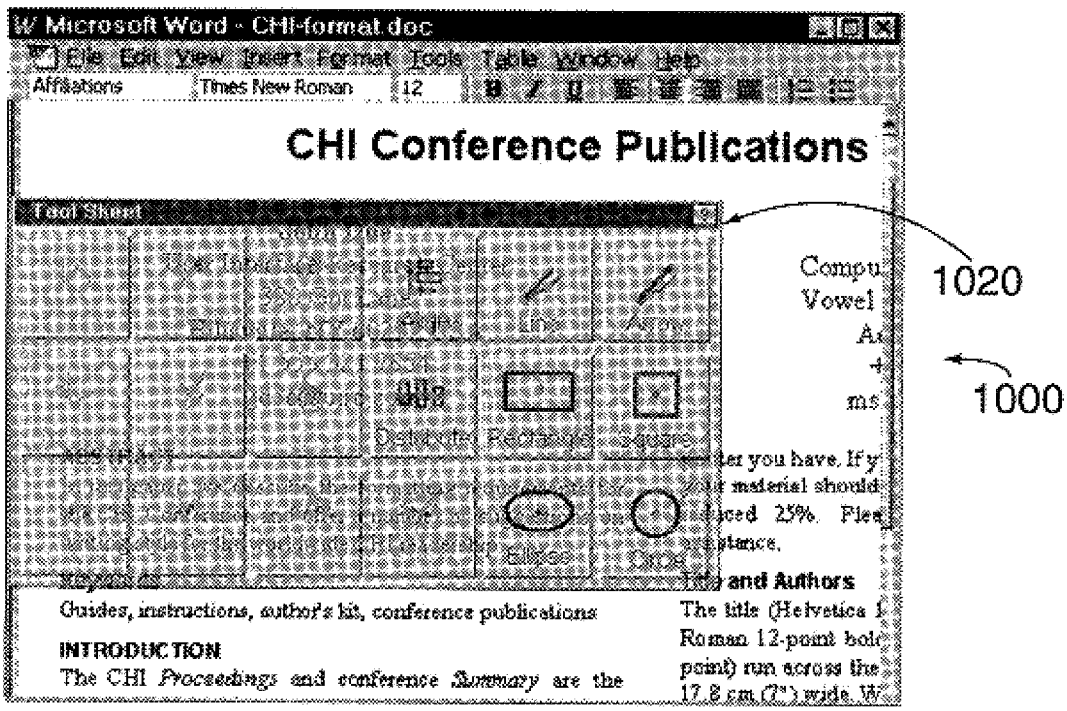

The apparent misregistration in FIG. 9B (as well as in FIGS. 10B and 10E) is caused by a screen grab operation that occurred while the toolbars were fading from a "normal" sized representation (as shown in FIG. 9A) to a "compact" representation (as shown in FIG. 10C). Since one representation was fading in while the other was simultaneously fading out, both representations were captured. But since both representations are only simultaneously visible for a brief fraction of a second (far shorter than a minimum interval that could be usually perceived by a human), this misregistration would not be noticed by a user when viewing these displays on display 692, and hence is of no consequence.

Based on the widgets then being displayed, this decision process can also fade-out one display widget and fade-in another based on subsequent user contact with a particular input pointing device. For example, if the toolbars are being displayed but a user then also establishes finger contact with the touchpad, thus explicitly indicating a desire to utilize a Tool Glass tool, animation process 815 could fade-out the toolbar(s) and fade-in the Tool Glass sheet regardless of continued hand contact with the Touch Mouse. This is depicted in screen display 1000 shown sequentially in FIGS. 10A–10E.

Figure 10D:
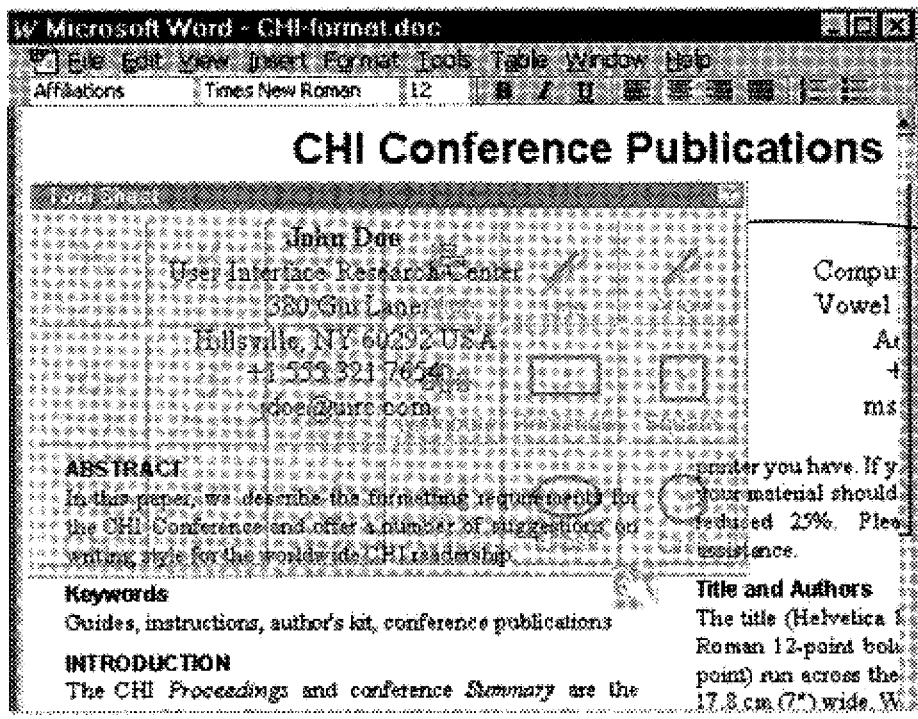
Figure 10E:
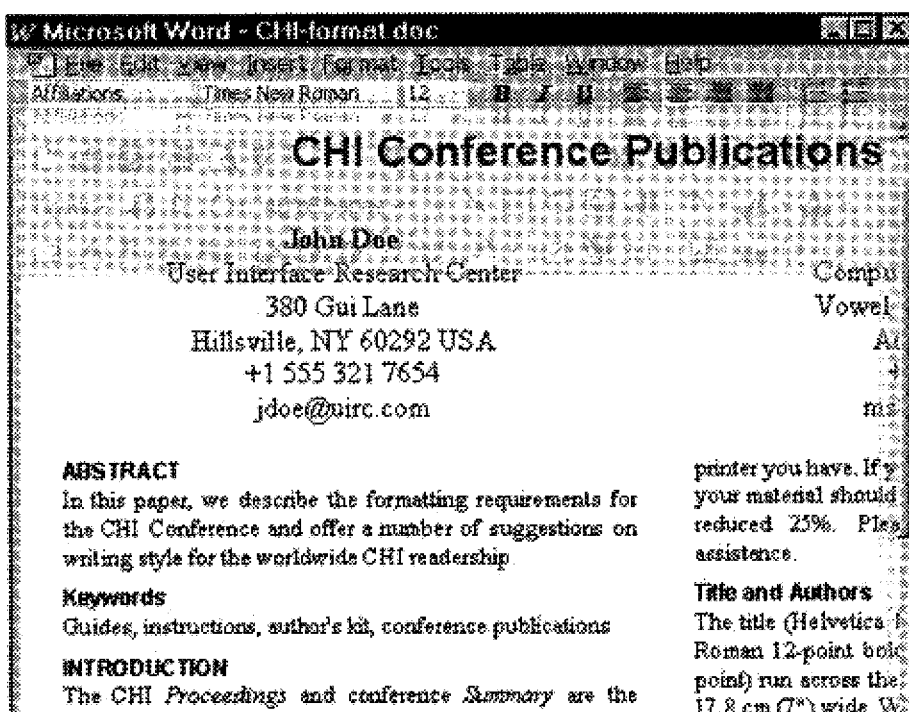

Specifically, FIG. 10A shows illustrative display 1000 (which is identical to display 900 shown in FIG. 9A, but has been duplicated as a separate figure to simplify reader understanding) as it would appear on display 692 (see FIGS. 2 and 6) while the user is holding the Touch Mouse but without any finger contact with the touchpad. Here, toolbars 1010 are completely visible. Once a finger of the user touches the touch sensitive surface of the touchpad, toolbars 1010 will start fading-out, as shown in FIG. 9B and Tool Glass sheet 1020 will start fading in. Eventually, as shown in FIG. 10C, Tool Glass sheet 1020 will have been completely faded-in (on a semi-transparent basis, as noted above) and the toolbars will have vanished. Once the user completes his operation with the Tool Glass sheet and lifts his(her) finger from the touchpad, then, as shown in FIG. 10D, Tool Glass sheet 1020 will begin to fade-out, and as shown in FIG. 10E, toolbars 1010 will begin to fade back in. Eventually, the display will return to that shown in FIG. 11A with toolbars 1010 being fully faded in and completely visible.

Furthermore, based on the particular operation then being invoked, either through a toolbar icon or a Tool Glass tool, "on-demand" fading-out may be pre-empted for the duration of that operation even if the user were to release the associated input pointing device. For example, if the user were to invoke a magnify operation, i.e., to magnify the display of a display object underlying a Tool Glass sheet, then should the user release the touchpad before (s)he was finished observing the object, the magnification might prematurely cease. To avoid this result, GUI 810 would prevent the Tool Glass from fading out during the entire duration of this operation regardless of whether the user ceased finger contact with the touchpad.

My inventive interface can also provide interactive audio feedback, specifically audio cue sounds, for various functions invoked through the interface and/or individual user events provided to the interface. For example, appropriate cue tones or other sounds could be generated, for use as aural feedback, as the user selects either an icon on a toolbar or tool on a Tool Glass sheet, moves a cursor across successive tools on the sheet and/or invokes a desired operation through either an icon or tool. To accomplish this, a desired audio cue tone would be mapped to a specific function or user event(s). Volume, pitch, and timbre could be adjusted to produce appropriate cues that mimic desired sounds, such as, e.g., "paper sliding on a desk" sound, a click sound or a musical chord. Cue sounds are generated by taking parametric sound event requests and sequencing them using MIDI wavetable synthesizer 662 through audio generator 640 (illustratively the Creative Labs AWE64 Gold card sound board) (see FIG. 6). The specific techniques for establishing correct audio parameters for each audio cue, properly synthesizing the audio cues, and associating cues with corresponding user events and/or functions are all readily apparent to those skilled in the art and do not form part of the present invention. Hence, I have intentionally omitted all details of these techniques from this discussion.

By now those skilled in the art clearly recognize that although I have described my inventive technique in conjunction with my inventive Touch Mouse and touchpad, any other user input device that provides touch, as an additional degree of freedom, and at least two-dimensional position sensing can be used instead. These other devices can include a trackball, that has been modified to sense touch, an isotonic (position-sensing) or isometric (force-sensing) joystick, or another touchpad.

Generally speaking, any touch-sensing input pointing device can be used in lieu of the Touch Mouse as long as that device provides at least a 2-dimensional positioning signal (or other continuous signal) and at least a separate one-bit signal from a touch (contact) sensor integrated with that device. The touch signal needs to reliably indicate when a user makes contact with the device, maintains contact with the device and releases the device.

A conventional mouse could be used in place of the Touch Mouse. Here, contacting the touchpad by a finger of the non-preferred hand could be used to display and/or dismiss a toolbar(s) on an on-demand basis -though the underlying user action would be explicit rather than implicit. Also, software could attempt to infer touch and release events by observing mouse motion and choosing time-out periods. However, such inferences will likely have an error rate associated with them; nonetheless, such inferences may prove useful in situations where a Touch Mouse is not available.

Alternatively, a track ball modified to detect touch, or having appropriate peripherally located buttons, could be used in lieu of the Touch Mouse or the touchpad to provide on-demand sensing. Moreover, the touchpad could be replaced by another Touch Mouse or a conventional mouse—though, with a conventional mouse, mouse clicks or software inference (as noted above) could be used as a substitute to generate user events which the former would generate based on touch. Furthermore, a second touchpad, with appropriate peripheral buttons (as shown in FIG. 3), could be used in lieu of a Touch Mouse; hence, concurrently utilizing two touchpads, rather than one and a Touch Mouse.

Moreover, a touch sensing keyboard, capable of separately sensing contact with each hand, in combination with a conventional mouse could be used in lieu of or in combination with both the Touch Mouse and the touchpad, or in conjunction with the Touch Mouse to provide on-demand display widget display and dismissal. Here, a toolbar(s) could completely fade-out starting when a user enters text through the keyboard. If one of the touch sensors on the keyboard were to detect that one hand left the keyboard while the other remained in contact with the keyboard, then the toolbars could begin to fade-in. As such, by the time the user were to grab a mouse with his(her) preferred hand, (s)he would begin to see the toolbar. If a Touch Mouse were used, then once the mouse sensed contact with the user, the interface could complete the fade-in of the toolbar rendering it completely visible. On the other hand, if the user did not grab the Touch Mouse within a short period of time after his(her) hand left the keyboard, the interface could then completely fade-out the toolbar. These touch sensors could also be used to uniquely detect handedness (i.e., left or right) of the user. Here too, non-contact proximity sensors could be integrated into the keyboard, in lieu of or in combination with contact sensors, to detect when the user's hand(s) is close to the keyboard but not actively engaging it.

Furthermore, my inventive interface could be extended such that when an application first starts, the toolbars would be visible and a document would appear underneath the toolbar(s). Whenever a user releases the Touch Mouse (or other touch sensitive input pointing device for preferred hand use), a margin will appear above the document, thus permitting the user to perceive the top of the document. Doing so prevents this portion of the document from being covered by the toolbar(s)—as might conventionally occur. Moreover, when the application first starts and the user is not contacting the Touch Mouse, the toolbar(s) could be displayed so that the user is not surprised when the toolbar(s) subsequently vanishes. In this instance, the toolbar(s) could disappear only after the user first touches and then releases the Touch Mouse—in effect the user provides an explicit input event to trigger a toolbar transition and thus understands its disappearance. Where a user engages in a click-through-and-drag operation with a Tool Glass sheet and in conjunction with the Touch Mouse, the inventive interface could be extended such that a toolbar(s) will not fade back in until the user releases a mouse button, even if (s)he were to lift his(her) finger off the touchpad. If the user were still touching the touchpad, then the Tool Glass sheet could fade back in once the mouse button is released.

In addition, user events other than touch sensing or in combination with touch sensing could be used to effectuate an on-demand interface. These events can include, e.g.: mouse cursor position, mouse motion, mouse button click or release events, mouse wheel motion, location of a keyboard insertion point in a document, type or location of a currently selected object on a display screen, time-outs or time delays after the occurrence of a particular event. Moreover, other sensing technologies, apart from touch sensing, could be used to invoke on-demand action, such as, e.g.: galvanic skin response, non-contact proximity sensors, pressure sensors, events from touch/proximity sensors on a keyboard, data from a GPS (global positioning system) receiver (position of the user or location of a mobile computer), video data from a camera, and audio data from a microphone.

Moreover, conventional decision-theoretic approaches could be integrated with my inventive on-demand interface to produce additional or improved decisions as to how to combine multiple user events or produce reasoned decisions about what portions of a screen display are important and need to be hidden or displayed.

In addition, though I have described my invention in the context of use with a two-handed user interface, the on-demand aspect of the invention is equally applicable to a one-handed interface where touch is used to display and/or dismiss a Tool Glass or other display widget, either with controlled animation or not. However, use of a Tool Glass is considerably less efficient through a one-handed interface, where its display, dismissal and manipulation are all controlled through preferred hand interaction, than with a two-handed one.

Although an embodiment which incorporates the teachings of the present invention has been shown and described in detail herein, those skilled in the art can readily devise many other embodiments that still utilize these teachings.

I claim:

1. Apparatus for use with a computer system for implementing a Tool Glass based user interface, the system having a processor and a memory, connected to the processor, for storing computer executable instructions therein, and a display connected to the system, the apparatus comprising:

first and second input devices for connection to the system, wherein the first and second devices are manipulated by non-preferred and preferred hands, respectively, of a user, and each of the devices directly senses both whether the user is touching said each device and movement of said each device as it is being manipulated by a corresponding one of the hands, the first and second devices having first and second touch sensors for generating first and second output signals responsive to whether the user is touching the first and second devices with the non-preferred and preferred hands, respectively;

a graphical display, rendered on the display and produced by the system in response to the executable instructions, having a Tool Glass, containing at least one icon, a display area and a cursor, wherein the Tool Glass, as a first display widget, is situated over the display area but below the cursor, the Tool Glass and cursor being separately positionable in response to movement of the first and second devices, respectively; and wherein the system displays or dismisses the Tool Glass in response to the first output signal produced by the first touch sensor and reflective of whether the non-preferred hand of the user then establishes or breaks physical contact with the first device by touching or releasing the first device, respectively.

2. The apparatus in claim 1 wherein the first device is a touchpad, touch sensitive mouse, touch sensitive trackball or other touch sensitive input pointing device.

3. The apparatus in claim 2 wherein the processor, in response to the executable instructions, controls fading of the Tool Glass in response to the first output signal such that upon initiation of the physical contact the Tool Glass fades into view from a substantially invisible state having a first predefined opacity to a semi-transparent state having a second predefined opacity and upon cessation of the physical contact the Tool Glass fades out of view from the semi-transparent state back to the substantially invisible state.

4. The apparatus in claim 3 wherein the first and second predefined opacities are approximately $0\alpha$ and at least approximately $0.7\alpha$, respectively, where $0\alpha$ and $1\alpha$ represent full transparency and full opacity, respectively.

5. The apparatus in claim 3 wherein the processor, in response to the executable instructions, fades the Tool Glass into and out of view over predefined first and second time intervals, respectively, and controls opacity of the Tool Glass while fading during each of the first and second intervals in response to predefined first and second functions, respectively.

6. The apparatus in claim 5 wherein the processor, in response to the executable instructions, initiates fading of the Tool Glass into view and out of view in response to corresponding transitions in the first output signal indicative of the non-preferred hand of the user establishing and breaking physical contact with the first device.

7. The apparatus in claim 6 wherein either of the predefined first and second functions is a predefined non-linear function of opacity with respect to time.

8. The apparatus in claim 7 wherein the non-linear function provides slow-in/slow-out fading.

9. The apparatus in claim 6 wherein either of the first and second predefined functions is a linear function.

10. The apparatus in claim 6 wherein the first and second intervals are, in duration, approximately 0.5 seconds or less, and at least approximately 1 second, respectively.

11. The apparatus in claim 6 wherein the first and second predefined opacities are approximately $0\alpha$ and at least approximately $0.7\alpha$, respectively, where $0\alpha$ and $1\alpha$ represent full transparency and full opacity, respectively.

12. The apparatus in claim 6 further comprising graphics and output circuitry, connected to the processor and the display, capable of implementing alpha-transparent graphic operations wherein the processor, in response to the executable instructions, issues instructions to the circuitry so as to change an alpha-transparency value of the Tool Glass rendered on the display for successive display frames during the first and second intervals and so implement a controlled animation sequence which, during the successive frames, fades the Tool Glass into or out of view, respectively.

13. The apparatus in claim 12 wherein the processor, in response to the executable instructions, varies coloration or luminance of the Tool Glass between successive ones of the frames during the animation sequence.

14. The apparatus in claim 12 wherein either of the predefined first and second functions is a predefined non-linear function of opacity with respect to time.

15. The apparatus in claim 14 wherein the non-linear function provides slow-in/slow-out fading.

16. The apparatus in claim 13 wherein either of the first and second predefined functions is a linear function.

17. The apparatus in claim 13 wherein the first and second intervals are, in duration, approximately 0.5 seconds or less, and at least approximately 1 second, respectively.

18. The apparatus in claim 13 wherein the first and second predefined opacities are approximately $0\alpha$ and at least approximately $0.7\alpha$, respectively, where $0\alpha$ and $1\alpha$ represent full transparency and full opacity, respectively.

19. The apparatus in claim 3 wherein the second device is a touchpad, touch sensitive mouse, touch sensitive trackball or other touch sensitive input pointing device and the processor, in response to the executable instructions, controls fading on the display of a second display widget, other than the Tool Glass, in response to the second output signal such that, in response to the preferred hand touching the second input device, the second display widget fades into view from a substantially invisible state having a third predefined opacity to an opaque state having a fourth predefined opacity and, in response to the preferred hand releasing the second input device, the second display widget fades out of view from the substantially opaque state back to the substantially invisible state.

20. The apparatus in claim 19 wherein if both the Tool Glass and the second display widget are simultaneously being rendered on the display and the physical contact ceases between the preferred hand and the second input device, the processor, in response to the executable instructions and which specific widgets are then being displayed, an operation then occurring or a relative display prioritization among widgets that could be simultaneously displayed, does not fade the second display widget from view.

21. The apparatus in claim 19 wherein the processor, in response to the executable instructions, fades the second display widget into and out of view over predefined third and fourth time intervals, respectively, and controls opacity of the second display widget while fading during each of the third and fourth intervals in response to predefined third and fourth functions.

22. The apparatus in claim 21 wherein the processor, in response to the executable instructions, initiates fading of the second display widget into view and out of view in response to corresponding transitions in the second output signal indicative of the preferred hand of the user establishing and breaking physical contact with the second device.

23. The apparatus in claim 22 wherein either of the predefined third and fourth functions is a predefined non-linear function of opacity with respect to time.

24. The apparatus in claim 23 wherein the non-linear function provides slow-in/slow-out fading.

25. The apparatus in claim 22 wherein either of the third and fourth predefined functions is a linear function.

26. The apparatus in claim 22 wherein the third and fourth intervals are, in duration, approximately 0.5 seconds or less, and at least approximately 1 second, respectively.

27. The apparatus in claim 22 wherein the third and fourth predefined opacities are approximately full transparency and full opacity, respectively.

28. The apparatus in claim 22 further comprising graphics and output circuitry, connected to the processor and the display, capable of implementing alpha-transparent graphic operations wherein the processor, in response to the executable instructions, issues instructions to the circuitry so as to change an alpha-transparency value of the second display widget rendered on the display for successive display frames occurring during the third and fourth intervals and so implement a controlled animation sequence which, during the successive frames, fades the second display widget into or out of view, respectively.

29. The apparatus in claim 28 wherein the processor, in response to the executable instructions, varies coloration or luminance of the second display widget between successive ones of the frames during the animation sequence.

30. The apparatus in claim 28 wherein either of the predefined third and fourth functions is a predefined non-linear function of opacity with respect to time.

31. The apparatus in claim 30 wherein the non-linear function provides slow-in/slow-out fading.

32. The apparatus in claim 29 wherein either of the third and fourth predefined functions is a linear function.

33. The apparatus in claim 29 wherein the third and fourth intervals are, in duration, approximately 0.5 seconds or less, and at least approximately 1 second, respectively.

34. The apparatus in claim 29 wherein the third and fourth predefined opacities are approximately full transparency and full opacity, respectively.

35. The apparatus in claim 19 wherein each of the first and second touch sensors produces a one-bit output signal.

36. The apparatus in claim 19 wherein the second input device is a touch sensitive mouse comprising:
 a palm support; and
 a palm sensor, as the second touch sensor and situated directly on the palm support, for determining whether a palm of the preferred hand is abutting against the palm support so as to generate the second output signal.

37. The apparatus in claim 36 wherein the processor, in response to the executable instructions, fades the second display widget into and out of view over predefined third and fourth time intervals, respectively, and controls opacity of the second display widget while fading during each of the third and fourth intervals in response to predefined third and fourth functions.

38. The apparatus in claim 37 wherein the processor, in response to the executable instructions, initiates fading of the second display widget into view and out of view in response to corresponding transitions in the second output signal indicative of the preferred hand of the user establishing and breaking physical contact with the second device.

39. The apparatus in claim 38 wherein either of the predefined third and fourth functions is a predefined non-linear function of opacity with respect to time.

40. The apparatus in claim 39 wherein the non-linear function provides slow-in/slow-out fading.

41. The apparatus in claim 38 wherein either of the third and fourth predefined functions is a linear function.

42. The apparatus in claim 38 wherein the third and fourth intervals are, in duration, approximately 0.5 seconds or less, and at least approximately 1 second, respectively.

43. The apparatus in claim 38 wherein the third and fourth predefined opacities are approximately full transparency and full opacity, respectively.

44. The apparatus in claim 38 further comprising graphics and output circuitry, connected to the processor and the display, capable of implementing alpha-transparent graphic operations wherein the processor, in response to the executable instructions, issues instructions to the circuitry so as to change an alpha-transparency value of the second display widget rendered on the display for successive display frames occurring during the third and fourth intervals and so implement a controlled animation sequence which, during the successive frames, fades the second display widget into or out of view, respectively.

45. The apparatus in claim 44 wherein the processor, in response to the executable instructions, varies coloration or luminance of the second display widget between successive ones of the frames during the animation sequence.

46. The apparatus in claim 44 wherein either of the predefined third and fourth functions is a predefined non-linear function of opacity with respect to time.

47. The apparatus in claim 46 wherein the non-linear function provides slow-in/slow-out fading.

48. The apparatus in claim 45 wherein either of the third and fourth predefined functions is a linear function.

49. The apparatus in claim 45 wherein the third and fourth intervals are, in duration, approximately 0.5 seconds or less, and at least approximately 1 second, respectively.

50. The apparatus in claim 45 wherein the third and fourth predefined opacities are approximately full transparency and full opacity, respectively.

51. A method for implementing a Tool Glass based user interface for use with a computer system, the system having a processor and a memory, connected to the processor, for storing computer executable instructions therein, and a display connected to the system, the method comprising the steps of:
 manipulating first and second input devices connected to the system by non-preferred and preferred hands, respectively, of a user, wherein each of the devices directly senses both whether the user is touching said each device and movement of said each device as it is being manipulated by a corresponding one of the hands, the first and second devices having first and second touch sensors for generating first and second output signals responsive to whether the user is touching the first and second devices with the non-preferred and preferred hands, respectively;
 rendering a graphical display on the display connected to the system, the graphical display being produced by the system in response to the executable instructions and having a Tool Glass, containing at least one icon, a display area and a cursor, wherein the Tool Glass, as a first display widget, is situated over the display area but below the cursor, the Tool Glass and cursor being separately positionable in response to movement of the first and second devices, respectively; and
 displaying or dismissing the Tool Glass in response to the first output signal produced by the first touch sensor and reflective of whether the non-preferred hand of the user then establishes or breaks physical contact with the first device by touching or releasing the first device, respectively.

52. The method in claim 51, wherein the first device is a touch sensitive input pointing device, further comprising the step of controlling fading of the Tool Glass in response to the first output signal such that upon initiation of the physical contact the Tool Glass fades into view from a substantially invisible state having a first predefined opacity to a semi-transparent state having a second predefined opacity and upon cessation of the physical contact the Tool Glass fades out of view from the semi-transparent state back to the substantially invisible state.

53. The method in claim 52 wherein the first and second predefined opacities are approximately $0\alpha$ and at least approximately $0.7\alpha$, respectively, where $0\alpha$ and $1\alpha$ represent full transparency and full opacity, respectively.

54. The method in claim 52 further comprising the steps of:
 fading the Tool Glass into and out of view over predefined first and second time intervals, respectively; and
 controlling opacity of the Tool Glass while fading during each of the first and second intervals in response to predefined first and second functions, respectively.

55. The method in claim 54 further comprising the step of initiating fading of the Tool Glass into view and out of view in response to corresponding transitions in the first output signal indicative of the non-preferred hand of the user establishing and breaking physical contact with the first device.

56. The method in claim 55 wherein either of the predefined first and second functions is a predefined non-linear function of opacity with respect to time.

57. The method in claim 56 wherein the non-linear function provides slow-in/slow-out fading.

58. The method in claim 55 wherein either of the first and second predefined functions is a linear function.

59. The method in claim 55 wherein the first and second intervals are, in duration, approximately 0.5 seconds or less, and at least approximately 1 second, respectively.

60. The method in claim 55 wherein the first and second predefined opacities are approximately $0\alpha$ and at least approximately $0.7\alpha$, respectively, where $0\alpha$ and $1\alpha$ represent full transparency and full opacity, respectively.

61. The method in claim 55 further comprising the step of changing an alpha-transparency value of the Tool Glass rendered on the display for successive display frames occurring during the first and second intervals and so implement a controlled animation sequence which, during the successive frames, fades the Tool Glass into or out of view, respectively.

62. The method in claim 61 further comprising the step of varying coloration or luminance of the Tool Glass between successive ones of the frames during the animation sequence.

63. The method in claim 61 wherein either of the predefined first and second functions is a predefined non-linear function of opacity with respect to time.

64. The method in claim 63 wherein the non-linear function provides slow-in/slow-out fading.

65. The method in claim 62 wherein either of the first and second predefined functions is a linear function.

66. The method in claim 62 wherein the first and second intervals are, in duration, approximately 0.5 seconds or less, and at least approximately 1 second, respectively.

67. The method in claim 62 wherein the first and second predefined opacities are approximately $0\alpha$ and at least approximately $0.7\alpha$, respectively, where $0\alpha$ and $1\alpha$ represent full transparency and full opacity, respectively.

68. The method in claim 52, wherein the second device is a touch sensitive input pointing device, further comprising the step of controlling fading on the display of a second display widget, other than the Tool Glass, in response to the second output signal such that, in response to the preferred hand touching the second input device, the second display widget fades into view from a substantially invisible state having a third predefined opacity to an opaque state having a fourth predefined opacity and, in response to the preferred hand releasing the second input device, the second display widget fades out of view from the substantially opaque state back to the substantially invisible state.

69. The method in claim 68 further comprising the step, if both the Tool Glass and the second display widget are simultaneously being rendered on the display and the physical contact ceases between the preferred hand and the second input device, of not fading the second display widget from view in response to which specific widgets are then being displayed, an operation then occurring or a relative display prioritization among widgets that could be simultaneously displayed.

70. The method in claim 68 further comprising the steps of:

fading the second display widget into and out of view over predefined third and fourth time intervals, respectively; and controlling opacity of the second display widget while fading during each of the first and second intervals in response to predefined third and fourth functions.

71. The method in claim 70 further comprising the step of initiating fading of the second display widget into view and out of view in response to corresponding transitions in the second output signal indicative of the preferred hand of the user establishing and breaking physical contact with the second device.

72. The method in claim 71 wherein either of the predefined third and fourth functions is a predefined non-linear function of opacity with respect to time.

73. The method in claim 72 wherein the non-linear function provides slow-in/slow-out fading.

74. The method in claim 71 wherein either of the third and fourth predefined functions is a linear function.

75. The method in claim 71 wherein the third and fourth intervals are, in duration, approximately 0.5 seconds or less, and at least approximately 1 second, respectively.

76. The method in claim 71 wherein the third and fourth predefined opacities are approximately full transparency and full opacity, respectively.

77. The method in claim 71 further comprising the step of changing an alpha-transparency value of the second display widget rendered on the display for successive display frames occurring during the third and fourth intervals and so implement a controlled animation sequence which, during the successive frames, fades the second display widget into or out of view, respectively.

78. The method in claim 77 further comprising the step of varying coloration or luminance of the second display widget between successive ones of the frames during the animation sequence.

79. The method in claim 77 wherein either of the predefined third and fourth functions is a predefined non-linear function of opacity with respect to time.

80. The method in claim 79 wherein the non-linear function provides slow-in/slow-out fading.

81. The method in claim 78 wherein either of the third and fourth predefined functions is a linear function.

82. The method in claim 78 wherein the third and fourth intervals are, in duration, approximately 0.5 seconds or less, and at least approximately 1 second, respectively.

83. The method in claim 78 wherein the third and fourth predefined opacities are approximately full transparency and full opacity, respectively.

* * * * *

UNITED STATES PATENT AND TRADEMARK OFFICE
CERTIFICATE OF CORRECTION

PATENT NO.    : 6,232,957 B1
DATED         : May 15, 2001
INVENTOR(S)   : Kenneth Paul Hinckley Page 1 of 1

It is certified that error appears in the above-identified patent and that said Letters Patent is hereby corrected as shown below:

Title page,
Item [56], References Cited, "5,457,280" has been replaced with -- 5,457,480 --.

Column 14,
Line 2, "7101" has been replaced with -- $710_1$ --.
Line 3, "710," has been replaced with -- $710_1$ --.
Line 31, "730," has been replaced with -- $730_1$ --.

Column 18,
Line 10, "11A" has been replaced with -- 10A --.

Signed and Sealed this

Twenty-first Day of May, 2002

Attest:

JAMES E. ROGAN
Attesting Officer    Director of the United States Patent and Trademark Office